(12) United States Patent
Slothouber et al.

(10) Patent No.: US 7,613,790 B2
(45) Date of Patent: Nov. 3, 2009

(54) APPARATUS FOR AND METHOD OF EXECUTING CUSTOMIZED INTERACTIVE COMPUTING SERVICES IN A BROADBAND NETWORK ENVIRONMENT

(75) Inventors: Louis P. Slothouber, Leesburg, VA (US); Aaron Y. Ye, Leesburg, VA (US); M. Ellen Dudar, Lovettsville, VA (US); Kelly F. Lent, Purcellville, VA (US); John J. Wiecek, Jr., Leesburg, VA (US)

(73) Assignee: BIAP Systems, Inc., Dulles, VA (US)

( * ) Notice: Subject to any disclaimer, the term of this patent is extended or adjusted under 35 U.S.C. 154(b) by 581 days.

(21) Appl. No.: 10/173,565

(22) Filed: Jun. 18, 2002

(65) Prior Publication Data

US 2003/0004961 A1    Jan. 2, 2003

Related U.S. Application Data

(63) Continuation-in-part of application No. 09/902,796, filed on Jul. 12, 2001, now Pat. No. 7,152,058, which is a continuation-in-part of application No. 09/615,830, filed on Jul. 13, 2000, now Pat. No. 7,313,588.

(51) Int. Cl.
*G06F 13/00* (2006.01)
(52) U.S. Cl. .................. 709/219; 709/225; 709/250
(58) Field of Classification Search .................. 709/217, 709/219, 224, 238, 223, 225, 250
See application file for complete search history.

(56) References Cited

U.S. PATENT DOCUMENTS 5,416,917 A    5/1995   Adair et al.
5,587,902 A    12/1996  Kugimiya
5,592,470 A *  1/1997   Rudrapatna et al. ......... 370/320

(Continued)

FOREIGN PATENT DOCUMENTS

EP    0774722    5/1997

(Continued)

OTHER PUBLICATIONS

Declaration of Charles T. Shotton, Jr., Civ. Action No. 00 906 1, E. D. Va., filed Jun. 1, 2001.

(Continued)

*Primary Examiner*—Viet Vu
(74) *Attorney, Agent, or Firm*—Hunton & Williams, LLP

(57) ABSTRACT

Apparatus for and method of executing customized interactive computing services in a broadband network environment. A device on the broadband network is capable of retrieving user-defined data over the network and format and display it on an associated display along with data broadcast over the broadband network. The device may be customer premises equipment such as a set-top-box, gaming console, or home gateway connected to the broadband network. In the case of a set-top-box, the broadcast data would be television programming. The device is preferably capable of retrieving data from a source on the internet. Retrieval and formatting are preferably carried out by compact software agents which are sent to the device through the network to be stored in and to execute on the device.

27 Claims, 18 Drawing Sheets

U.S. PATENT DOCUMENTS

| | | | |
|---|---|---|---|
| 5,610,910 A * | 3/1997 | Focsaneanu et al. | 370/351 |
| 5,616,876 A * | 4/1997 | Cluts | 84/609 |
| 5,649,186 A | 7/1997 | Ferguson | |
| 5,710,918 A | 1/1998 | Lagarde et al. | |
| 5,721,908 A | 2/1998 | Lagarde et al. | |
| 5,727,159 A | 3/1998 | Kikinis | |
| 5,768,528 A | 6/1998 | Stumm | |
| 5,805,165 A * | 9/1998 | Thorne et al. | 715/823 |
| 5,826,258 A | 10/1998 | Gupta et al. | |
| 5,864,863 A | 1/1999 | Burrows | |
| 5,877,755 A * | 3/1999 | Hellhake | 725/114 |
| 5,915,090 A * | 6/1999 | Joseph et al. | 709/202 |
| 5,963,937 A | 10/1999 | Yamasaki et al. | |
| 5,974,441 A | 10/1999 | Rogers et al. | |
| 5,983,267 A | 11/1999 | Shklar et al. | |
| 5,987,403 A | 11/1999 | Sugimura | |
| 5,996,000 A | 11/1999 | Shuster | |
| 6,012,083 A | 1/2000 | Savaitzky et al. | |
| 6,023,697 A | 2/2000 | Bates et al. | |
| 6,057,874 A * | 5/2000 | Michaud | 725/141 |
| 6,067,559 A | 5/2000 | Allard et al. | |
| 6,070,185 A | 5/2000 | Anupam et al. | |
| 6,085,186 A | 7/2000 | Christianson et al. | |
| 6,085,193 A | 7/2000 | Malkin et al. | |
| 6,088,731 A | 7/2000 | Kiraly et al. | |
| 6,092,099 A | 7/2000 | Irie et al. | |
| 6,108,686 A | 8/2000 | Williams, Jr. | |
| 6,154,528 A * | 11/2000 | Bennett et al. | 379/93.25 |
| 6,195,696 B1 * | 2/2001 | Baber et al. | 709/223 |
| 6,198,509 B1 * | 3/2001 | Dougherty et al. | 348/467 |
| 6,199,097 B1 | 3/2001 | Hachiya et al. | |
| 6,205,456 B1 | 3/2001 | Nakao | |
| 6,339,775 B1 | 1/2002 | Zamanian et al. | |
| 6,345,389 B1 * | 2/2002 | Dureau | 725/116 |
| 6,510,152 B1 * | 1/2003 | Gerszberg et al. | 370/352 |
| 6,567,411 B2 * | 5/2003 | Dahlen | 370/401 |
| 6,567,816 B1 | 5/2003 | Desai et al. | |
| 6,810,413 B1 * | 10/2004 | Rajakarunanayake et al. | 709/203 |
| 6,829,781 B1 * | 12/2004 | Bhagavath et al. | 725/94 |
| 6,907,563 B1 * | 6/2005 | Kumar et al. | 715/501.1 |
| 6,986,156 B1 * | 1/2006 | Rodriguez et al. | 725/95 |
| 7,000,243 B1 * | 2/2006 | Fenwick et al. | 725/74 |
| 7,028,327 B1 * | 4/2006 | Dougherty et al. | 725/93 |
| 7,039,933 B1 * | 5/2006 | Chen et al. | 725/36 |
| 7,079,176 B1 * | 7/2006 | Freeman et al. | 348/207.1 |
| 2002/0059637 A1 * | 5/2002 | Rakib | 725/119 |
| 2002/0108121 A1 * | 8/2002 | Alao et al. | 725/110 |
| 2002/1018464 * | 12/2002 | Delpuch | 725/112 |

FOREIGN PATENT DOCUMENTS

| | | |
|---|---|---|
| WO | WO 02/07013 | 1/2002 |

OTHER PUBLICATIONS

Ashish, N., et al.; "Semi-automatic Wrapper Generation for Internet Information Sources"; Cooperative Information Systems, 160-169; (1997).

Liu, Ling, et al.; "XWRAP: An XML-enabled Wrapper Construction System for Web Information Sources", Data Engineering, Proceedings, 16th International Conference on San Diego, CA, vol. 29, pp. 611-621 (2000).

Hsieh-Chang, T., et al.; "An Architecture and Category Knowledge for Intelligent Information Retrieval Agents", System Sciences, pp. 405-413, (1998).

Kent, C., et al., "Creating a web analysis and visualization environment", Computer Networks and ISDN Systems, pp. 109-117, vol. 28, No. 1, (1995).

* cited by examiner

APPARATUS FOR AND METHOD OF EXECUTING CUSTOMIZED INTERACTIVE COMPUTING SERVICES IN A BROADBAND NETWORK ENVIRONMENT

RELATED APPLICATIONS

This application is a continuation-in-part of U.S. patent application Ser. No. 09/615,830, filed Jul. 13, 2000 now U.S. Pat. No. 7,313,588, and a continuation-in-part of U.S. patent application Ser. No. 09/902,796, filed Jul. 12, 2001 now U.S. Pat. No. 7,152,058, the specifications of both of which are hereby incorporated herein by reference.

FIELD OF THE INVENTION

The present invention relates generally to the retrieval and display of information via a computer network. More particularly, it relates to the local execution of customizable, interactive computing services on computing devices that are connected to an external computer network via an intermediate broadband communications network.

BACKGROUND OF THE INVENTION

The processing power of conventional personal computing devices is said to double every eighteen months. When combined with the increasing availability of network bandwidth and accessible content, incomprehensibly large amounts of information are available for retrieval and review by individual computing device users. However, many of the most prevalent computing devices in the home or small office do not take advantage of this wealth of information. Such devices, often referred to as "customer premises equipment" (CPE) include the set-top-boxes that receive and decode digital cable or satellite television signals, video game consoles, and home network gateways. As opposed to general purpose devices such as PC's, these CPE devices are typically characterized by being targeted or dedicated to a specific application. Despite the ever increasing processing power in CPE devices and the high bandwidth connectivity available to them via their associated broadband networks, CPE devices and are most often employed simply to control the display of information or audio-video content that is broadcast to them from one or more centralized servers. This wealth of untapped computing and network resources can be applied to provide personalized interactive services to CPE device users.

Broadband networks typically connect a small number of powerful, centrally located server computers to a large number of remote CPE devices. Such networks are optimized to support high bandwidth broadcast of video, audio, graphic, text, and data content from the central servers out to CPE devices, but often provide much less bandwidth for communication in the other direction, from the CPE devices back to the central servers or out to external networks such as the internet.

The often limited computing power of CPE devices and asymmetrical nature of broadband networks creates an environment in which deployment of customizable, interactive applications for CPE devices is difficult. Extant systems continue the trend of using the CPE as simple display engines, and require many additional powerful centralized servers to perform the computing tasks necessary to support interactive services. This centralized server model does not scale well as the number of CPE users grows, especially when one considers the very large number of broadband network subscribers that are typical in the digital cable and satellite television industries.

There is thus a need for a system that provides customizable, interactive applications that execute primarily on the local CPE devices, that makes efficient use of the computing resources on those devices and the broadband networks to which they are connected, and that communicates with external data sources, centralized servers, or other CPE devices. Such a system must scale well for a large number of users, requiring no support from powerful centralized servers.

SUMMARY OF THE INVENTION

The present invention meets these needs through the provision of a system which makes efficient use of the computing resources and capacity available in a CPE device and the broadband network resources available to that device. This system consists of an interactive software application, executed locally on CPE devices, that communicates via a broadband network with external data sources and retrieves specific information for display to the CPE device user. All retrieval and display tasks, including the horizontal and vertical scrolling of text and graphics, are executed locally on the CPE device.

In some embodiments, such as that deployed in a digital cable television environment, a minimal "Head-End Equipment" (HEE) device may be installed at the head-end site or central office to supply services unavailable on the CPE devices themselves. Such services include persistent storage of personalized preferences, and bandwidth optimization via caching and broadcast of commonly requested external data. All significant computational tasks required to implement customizable interactive applications can be executed locally for each user on their own CPE devices. All network communication employed by the present invention can utilize the standard internet protocol (IP), or such layered protocols as may be commonly employed in conjunction with IP, such as TCP/IP and HTTP.

DESCRIPTION OF PREFERRED EMBODIMENTS

One aspect of the present invention is a system for executing software applications on "customer premises equipment" (CPE) devices that communicate via the standard "Internet Protocol" (IP) or derivative protocols over an extant broadband network to retrieve information from data sources connected to external computer networks, process the retrieved information, and selectively display the results locally on the CPE display device using various display mechanisms including horizontal and vertical scrolling of text and graphics.

In one presently preferred embodiment, deployed in the digital cable television environment, the system employs one inexpensive "head-end equipment" (HEE) device, the equivalent of a conventional desktop personal computer, to provide persistent storage of personalized preferences for all CPE devices, and to optimize network bandwidth utilization. While the terms "head-end equipment" and "HEE" are used herein, it will be understood by one of ordinary skill in the art that such equipment need not be physically located at the head end of a broadband network, but, instead, may be located essentially anywhere on the network. Further, not all software components need execute on a single HEE device; rather, components may be distributed among several distinct HEE devices at the same or different locations, but all interconnected via the IP-based network. In other embodiments, such as might be deployed in the digital satellite television, game console network, or home gateway environments, such support services and HEE devices may not be required.

Figure 1:
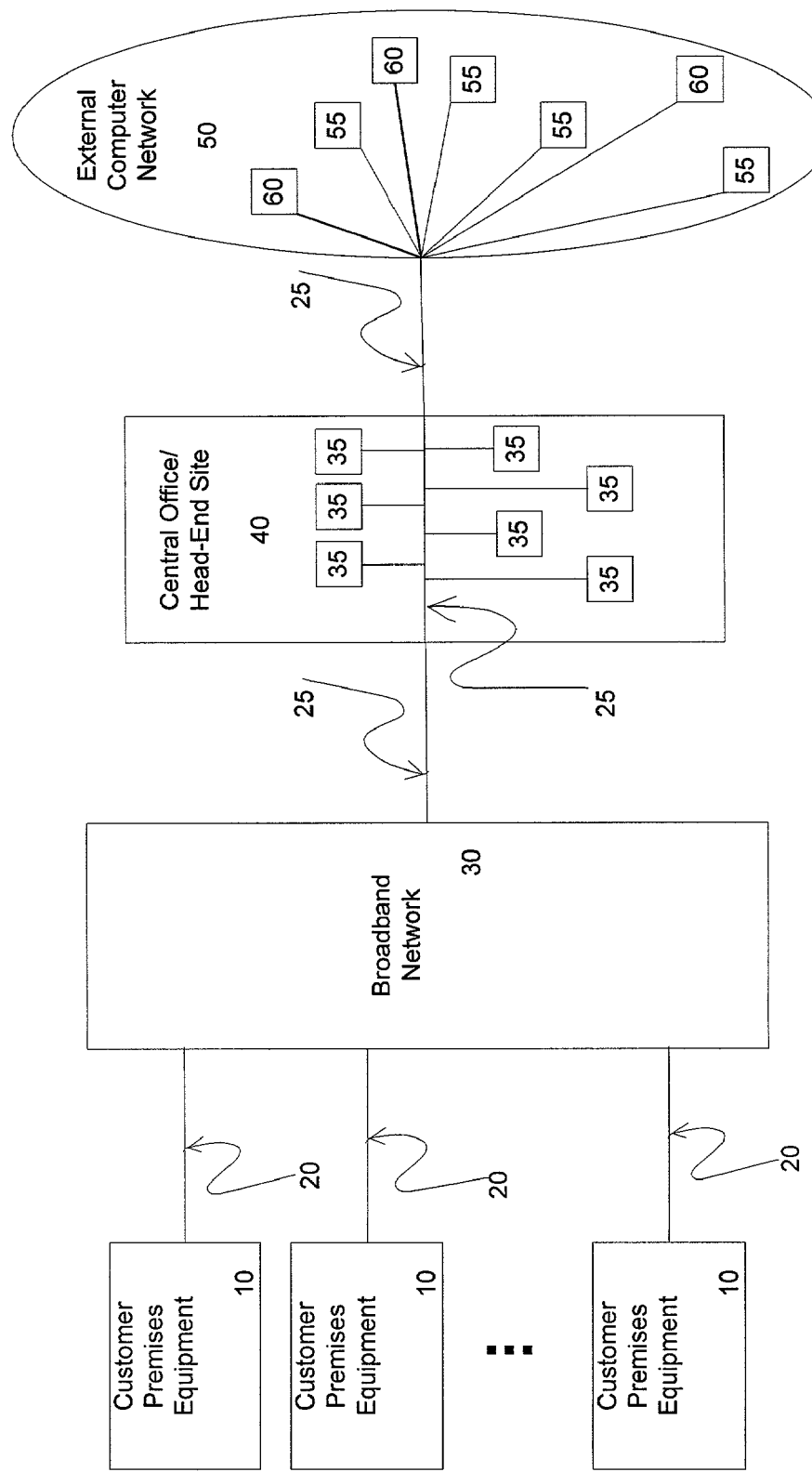
FIG. 1 is a diagram showing the hardware and network environment to which the current invention is applicable.

Referring now to the drawings, in which like reference numerals are used to refer to the same or similar elements, FIG. 1 shows an environment in which a system according to the invention may operate. Multiple CPE devices 10 are each connected via a IP-based network connection 20 to a broadband network 30. The other end of the broadband network 30 is connected via a network 25 to one or more server computers 35 located at a central office or head-end site 40. In a presently preferred embodiment of the invention, the network 25 is IP-based. One of ordinary skill in the art will readily appreciate, however, that any standard protocol may be used, so that while the example of the invention described herein is IP-based, the invention is not so limited. The network 25 may also be connected to an external TCP/IP-based network 50, which in turn may connect various network data sources 55. Regardless of the actual embodiments of the broadband network 30 and other environmental components, all CPE devices 10, central office/head-end servers 35 and external data sources 55 can communicate via IP-based protocols.

Figure 2:
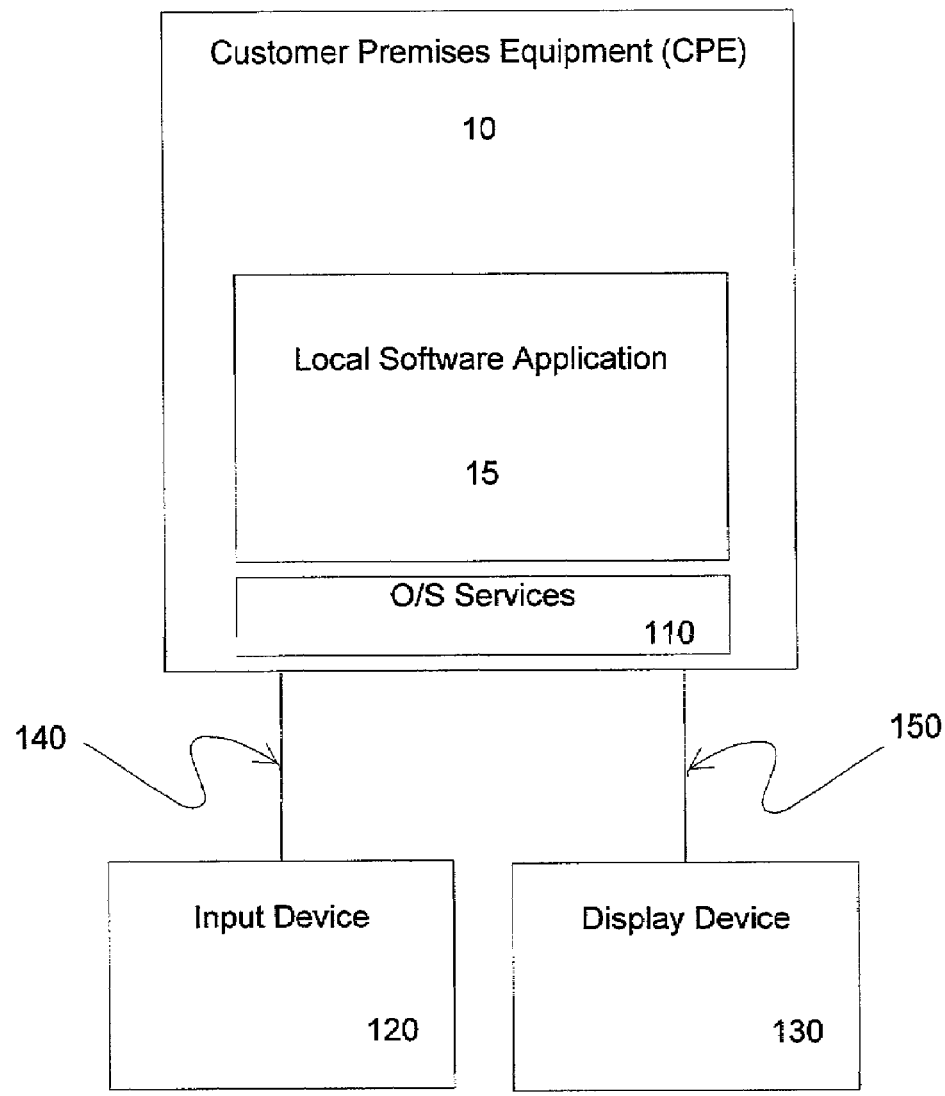
FIG. 2 is a diagram showing the software and hardware components common to customer premises devices.

A CPE device 10 may be a digital cable television set-top-box, a digital satellite television set-top-box, a gaming console, a home gateway, or any other computer device capable of accepting user input, displaying graphical or text information to one or more users, and connecting to a computer network 20 via the standard IP-based protocols. As depicted in FIG. 2, the CPE 10 is a computing device that is capable or executing programming instructions originating either from built-in storage or from external sources such as the server computers 35 located at the central office/head-end site 40. CPE devices provide either an operating system or other low-level software services 110 that allow applications 15 executing on the CPE device 10 to interface with CPE hardware 10 and the broadband network 30.

The CPE device 10 is connected to an input device 120 and a display device 130. The optional input device 120 may be a remote control, a keyboard, or any other device, either internal or external to the CPE device 10, that receives user input signals and communicates those signals to the CPE device 10 via any appropriate wired or wireless mechanism. The display device 130 may be a television, a computer monitor, a projector, or any other device, either internal or external to the CPE device 10, that is capable of receiving text, graphics, video or any other visual or audio information from the CPE device 10 via any appropriate wired or wireless mechanism, and presenting that information to one or more users.

Referring again to FIG. 1, the broadband network 30 may be any known wired or wireless network, including, singly or in combination, a cable television network, a satellite television network, a local area network (LAN), a wide area network (WAN), an analog telephone network, a digital telephone network, the Internet, or any other network capable of carrying IP-based network traffic. One end of the broadband network 30 connects to the various CPE devices 10. The other end of the broadband network 30 is located at a central office or head-end site 40, and connects to one or more centralized servers 35 via an internal network 25 that is capable of carrying IP-based network traffic.

Several types of extant broadband networks fit this description. For example, in a digital cable television network environment thousands of television set-top-boxes connect to television broadcast servers located at the head-end site via an underground network of fiber optic and conducting wire cables, and an extensive network hardware infrastructure. While each head-end may support on the order of 100,000 CPE devices, multiple head-end sites may be required to service an entire market. Usually, each head-end receives broadcast content from a single server located at a home office site.

A satellite television network environment is another example of a broadband network; television servers at a single central office site broadcast content to thousands or millions of television set-top-boxes via radio frequency transmissions relayed via satellite. Communication in the other direction, from the set-top-box back to the central office is usually accomplished via a transient IP connection over analog phone network lines.

Referring again to FIG. 1, CPE devices 10 and server computers 35 may communicate with external computer networks 50 via IP-based protocols such as TCP/IP. Such external computer networks 50 include the internet, extranets, virtual private networks (VPN), or other TCP/IP-based networks. A variety of information sources 55 are accessible via external computer networks 50, including web sites, e-mail servers, databases, and any other TCP/IP-based network services that communicate via any of the standard internet protocols built on top of TCP/IP, including but not limited to: HTTP, SMTP, POP, IMAP, ODBC and FTP. Information retrieved from external information sources 55 can be represented in a variety of formats, including but not limited to HTML, XML, RSS, RDF, PDF, MIME, plain text, GIF, JPEG, and MPEG.

Figure 3:
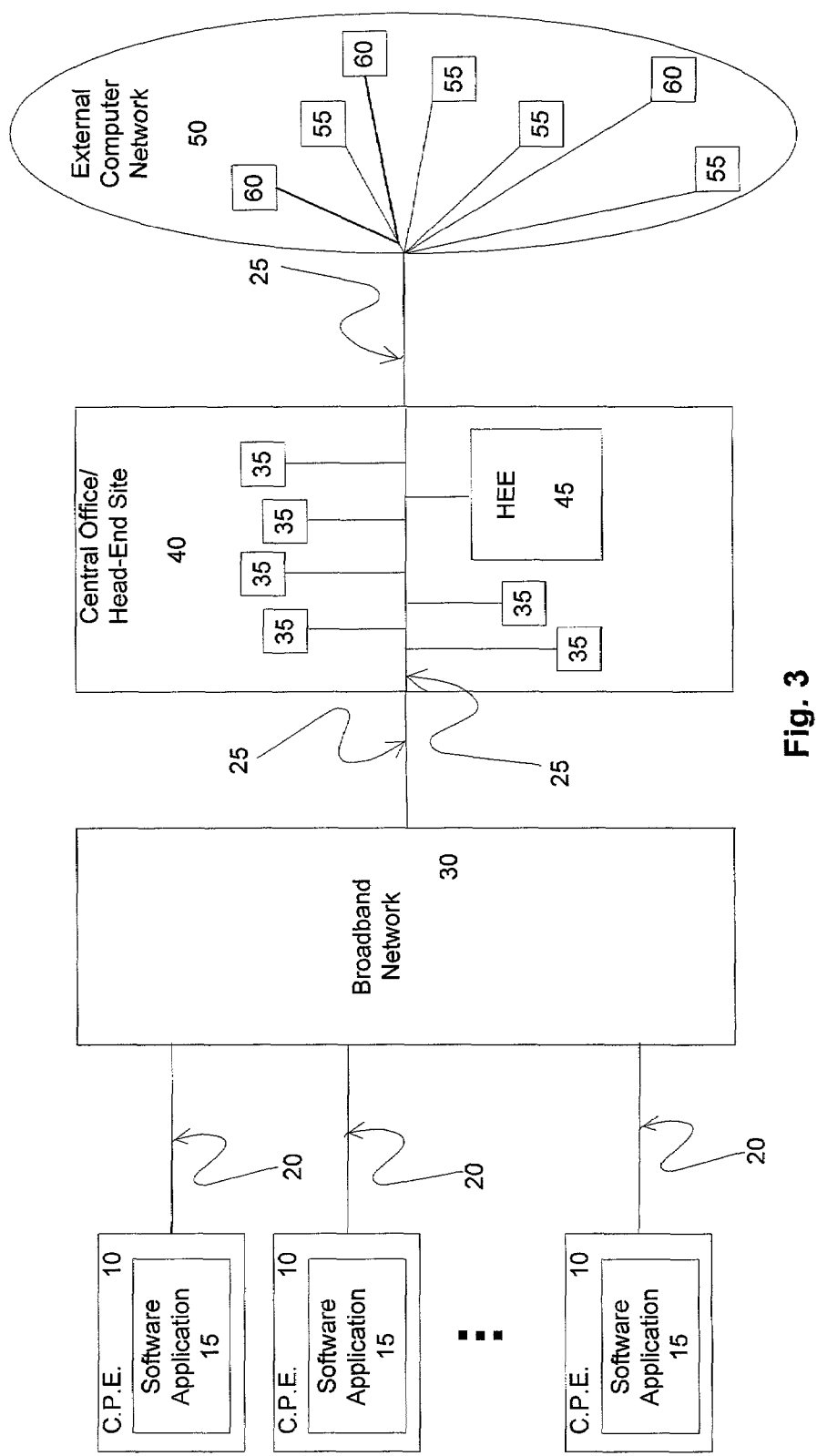
FIG. 3 is a diagram showing relationships between the two primary components of the presently preferred architecture of the subject invention and the surrounding hardware and network environment.

A system according to the present invention is depicted in FIG. 3 by integrating the elements into the broadband network environment of FIG. 1. The system includes a software application 15 executing directly on CPE computing devices 10 and a single HEE device 45 located at the central office/head-end site 40 and connected to an IP-based network 25. Preferably, all computation necessary to provide a personalized interactive service via the broadband network 30 is performed locally by the software application 15 executing on local CPE devices 10. The optional, remote HEE device 45 supplies services that are missing from specific CPE devices, such as persistent storage for personalized preferences, and optimizes the bandwidth utilization of the broadband network 30 by the system. The load placed on an HEE device by each CPE device 10 is miniscule, and the aggregate load of all CPE devices connected to a single head-end or central office 40 is well within the capacity of a single conventional PC or other HEE device.

A system according to the present invention is particularly advantageous since the massive amount of computation required to support a customizable personalized interactive service is distributed among the thousands or millions of simultaneously executing CPE devices, instead of performing all computation on one or more large-scale servers 35 at the central office/head-end site 40. Despite the limited computing resources of individual CPE devices 10, in the aggregate the large number of CPE devices 10 collectively provide more computing power and utilize the broadband network 30 bandwidth more efficiently than a system where one or more large-scale servers provides the computing power.

Figure 4:
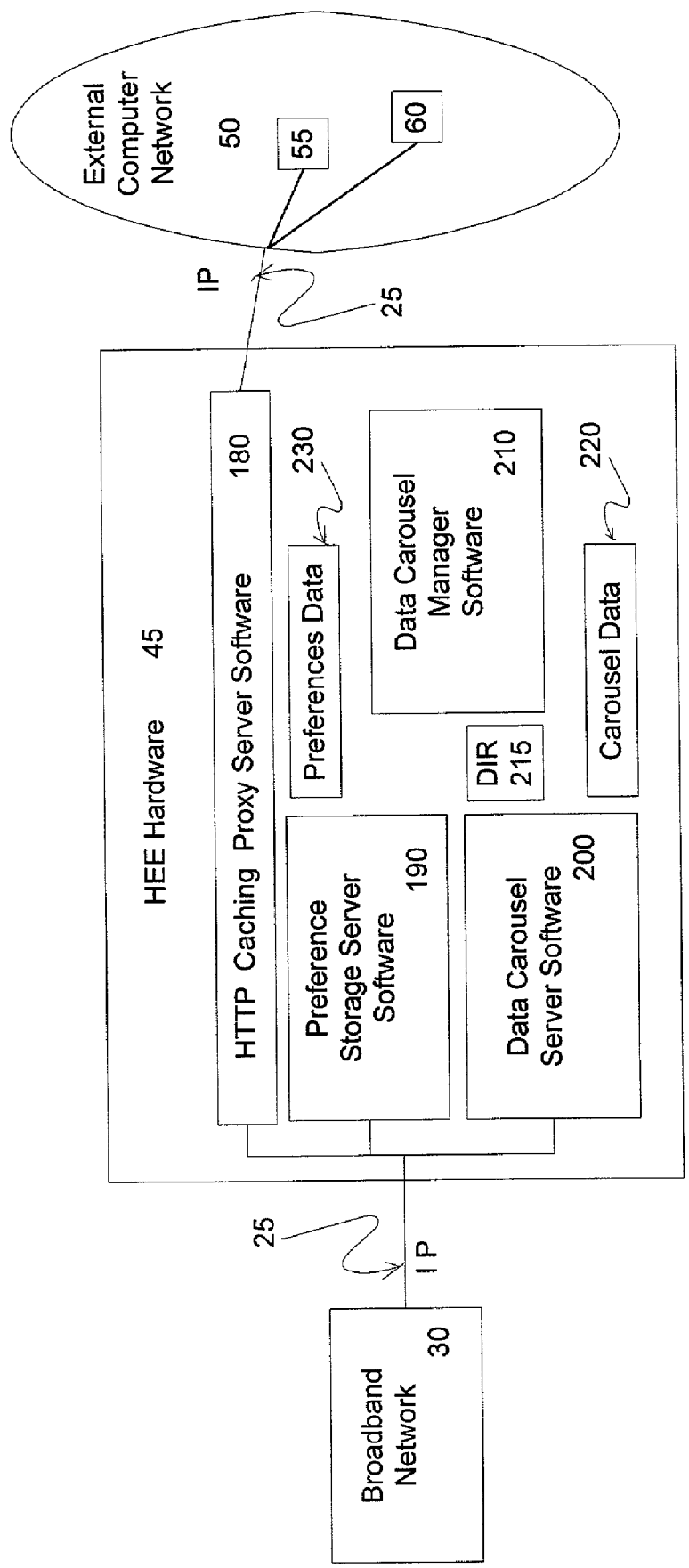
FIG. 4 is a diagram of the presently preferred HEE architecture according to the present invention.

The presently preferred embodiment of the HEE device 45 is depicted in FIG. 4. All TCP/IP communication using the HTTP protocol from the CPE software application 15 to external data sources 55 may be routed through a conventional caching proxy server software application 180, which caches local copies of frequently requested information, reducing outbound IP traffic and improving overall response time for requests made from the CPE applications 15.

A preference storage server software application 190 provides remote persistent storage services to CPE devices 10 that do not have sufficient local persistent storage in which to store the customized application preferences provided by the CPE user. The CPE software application 15 uses the HTTP protocol over TCP/IP to communicate with the preference storage server software 190 allowing a CPE application 15 to upload customized preferences data 230 after a user makes changes, and to download the customized preference data 230 whenever it is needed.

External computing devices 60 may also communicate with the preference storage server software application 190 via TCP/IP. This allows appropriately authenticated external applications to modify the customized application preferences stored in the preferences data 230, and thereby affect the behavior of individual CPE applications 15. For example, in a digital cable television environment, a CPE user may want to personalize their CPE application preferences via an application running on their personal computer, which may be one of the external computing devices 60. Similarly, application data may also be sent to the CPE applications 15 from external computing devices 60 via the preference storage server software application 190 and TCP/IP. Such application data may either modify or extend the functionality of the CPE applications 15.

A conventional data carousel server software application 200 utilizes a pre-defined portion of the IP bandwidth available on the broadband network 30 to repeatedly broadcast out carousel data 220 to all CPE devices 10, simultaneously. A CPE software application 15 that retrieves information broadcast by a data carousel server makes more efficient use of the available broadband network bandwidth than by retrieving that same information directly from the caching proxy server 180 or the original external data source 55. In a conventional broadband network environment all CPE devices 10 operate identically and require the same content from a conventional data carousel server software application 200. In a system according to the present invention, however, each CPE application 15 may request a distinct set of content items from a distinct set of external data sources 55.

To accommodate this diversity, a preferred embodiment of the subject invention incorporates a data carousel manager software application 210 to manage the contents of the carousel data 220. Because the content items retrieved from external data sources 55 by each CPE software application 15 are completely determined by the preference settings defined for that particular CPE application 15, and because all personalized preference settings for all CPE applications 15 connected to a particular HEE device 45 are stored in the preference data 230 on that or another HEE device 45, the frequency at which all content items will be requested via the caching proxy server software 180 can be derived from the preference data 230. The carousel manager 210 periodically performs this analysis to determine the most frequently requested content items, and subsequently retrieves the current versions of these content items via the caching proxy server 180 and stores them in the carousel data 220 for subsequent broadcast by the data carousel server 200. A catalog listing the current content items in the carousel data 230 is also produced. The carousel manager 210 periodically updates the content items in the carousel data 230 to keep them current with respect to the actual data on the external data sources 55.

Within a preferred system according to the present invention, the CPE software application 15 executes on a CPE device 10 to retrieve information from external data sources 55 via a broadband network 30 using IP-based network protocols. The retrieved information is then analyzed by the CPE software application 15 and reformatted for display on the CPE display device 130. Additionally, the CPE software application 15 must respond to input signals received from the input device 120 and provide a user interface that allows the local CPE user to customize application preferences for that CPE software application 15.

The CPE software application may be permanently stored in the CPE device 10. In systems where there is already an installed base of CPE devices 10, however, it is more convenient to load the CPE software application to the CPE device 10 either on boot-up or on demand. This makes the compact form and architecture of the application according to the invention particularly advantageous.

Figure 5:
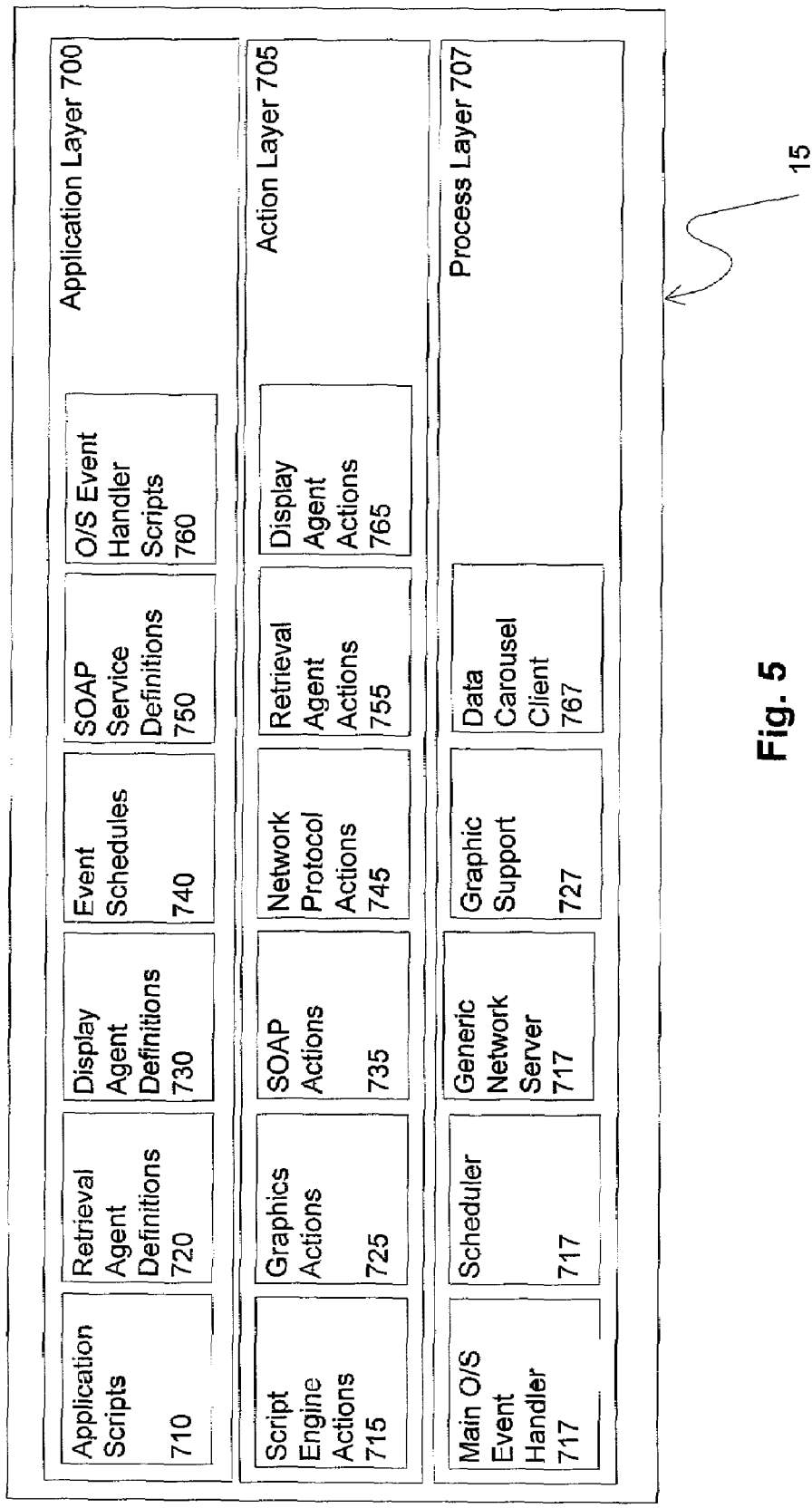
FIG. 5 is a graphical depiction of the presently preferred memory map of a CPE software application according to the present invention.

The presently preferred embodiment of the CPE software application 15 is a layered software architecture, as depicted in FIG. 5, wherein the components of each layer are all similar in nature but independent. The process layer 707 contains object code modules that respond to events generated by the operating system, user input, or the scheduler process 717, and invokes one or more of the application scripts 710 to respond to those events. The action layer 705 provides a variety of generic object code routines (also referred to as "actions" or "services") that are useful to a broad class of CPE software applications and are not specific to the particular CPE software application 15 in the presently preferred embodiment of the subject invention. Collectively the process layer 707 and action layer 705 constitute a generic CPE software application platform, while the application layer 707 contains scripts and data that define a specific CPE software application.

Each of the object code modules in the process layer 707 may define a unique process and in the presently preferred embodiment of the CPE software application 15 implements a distinct thread of execution. The main O/S event handler 717 receives events from the operating system 110 and CPE input device 120, and invokes the appropriate scripts from the application layer 700 to respond to those events. The scheduler 727 periodically examines the event schedules 740 and invokes one or more application scripts 710 to handle scheduled events. The generic network server 737 monitors all incoming TCP/IP listening sockets, if any, and invokes the appropriate application script 710 to handle the server connection as specified by the SOAP service definition data 750. The graphics support module 747 continuously updates the display of all animated graphics elements including but not limited to hotspot rectangles, horizontally scrolling text and graphics, vertically scrolling text and graphics, and graphical cursors. The script engine 757 interprets application scripts 710 invoked by the other process modules or other scripts.

Every action defined in the action layer 705 is an independent object code module which implements a common task, similar to a library function. Many actions are defined in the action layer 705, but for descriptive purposes they may be classified by function into categories without loss of generality. The database actions 715 allow application scripts to read and write from an internal XML database. The graphics actions 725 support the creation, management, and display of graphical objects, including but not limited to windows, hotspots, checkboxes, edit boxes, virtual keyboards, GIF and JPEG images, video regions, canvases, vertical scrolling text and graphics, horizontal scrolling text and graphics, static text, lines, polygons, shapes and regions. The SOAP actions 735 implement both client and server sides of the SOAP protocol for requesting and providing remote procedure calls and "web services" as defined by the SOAP service definitions 750. The network protocol actions 745 implement the client version of all standard internet protocols, including but not limited to HTTP, FTP, SMTP, POP, and IMAP.

The retrieval agent actions 755 implement retrieval agents according to the retrieval agent definitions 720. Retrieval agent definitions 720 define the sequence of operations necessary to retrieve, analyze, and process information from external data sources 55 and store it in an internal database for later display. Because these operations are similar for all retrieval agents, retrieval agent definitions 720 can be defined concisely to conserve storage space and to facilitate rapid execution via retrieval agent actions 755.

For example, in one preferred embodiment of the present invention a retrieval agent definition designed to retrieve stock data from remote XML files may have the following format:

```
http://stock.server.com/path/
   quote.html?symbol=@symbol
/displaydata/stocks/@index
OUT symbol=@symbol
GET <quote></quote> 0 0 0 &price=
GET <change></change> 0 0 0 &diff=
```

Each line of this definition defines an operation to be performed by the retrieval agent actions 755. Throughout the definition, all terms preceded by an "@" character reference a parameter of the same name supplied by the action caller, and the corresponding parameter value is substituted for the parameter reference prior to performing the operation. On each line the parameters for the operation are delimited by blank characters. The first line provides a URL where the remote data file may be found, and instructs the agent action to retrieve the file via the proxy server 180. The second line identifies a location in the internal XML database that is to be cleared, and where subsequent output produced by this agent is to be concatenated. The third line specifies a simple output of the text in the parameter. The fourth and fifth lines each describe an operation that retrieves and then outputs a snippet of text from the retrieved XML file, where the first parameter is a match string identifying the beginning of the snippet, the second parameter is a match string identifying the end of the snippet, the three numeric parameters define offsets to the character positions defined by the match strings, and the last parameter is a simple text string to be output immediately prior to outputting the snippet. A sequence of these and similar commands is sufficient for most retrieval agent tasks. Actual retrieval agents are scripts that may perform additional analysis and processing in addition to invoking retrieval agent actions 755 for one of the retrieval agent definitions 720.

Similarly display agent actions 765 implement display agents according to the display agent definitions 730. Display agent definitions 730 define the sequence of operations necessary to retrieve information from an internal database and to display that information on a CPE display device 130. Because these operations are similar for all display agents, display agent definitions 730 can be defined concisely to conserve storage space and to facilitate rapid execution via display agent actions 765.

In one preferred embodiment of the present invention display agent definitions 730 and display agent actions 765 are similar in form and function to their retrieval agent counterparts defined above, except that the set of operations supported by display agent actions 765 represent all of the graphics actions 725 for producing output on CPE display devices 130. But unlike retrieval agent actions 755, display agent actions 765 do not directly perform the operations specified in display agent definitions 730. Instead, each operation line in a definition is parsed and converted into a corresponding low-level graphics event and placed in the graphics event queue for subsequent handling by the graphics support process 747.

All application components defined in the application layer 700, including but not limited to application scripts 710, retrieval agent definitions 720, display agent definitions 730, event schedules 740, and SOAP service definitions, consist of data rather than object code. All application components are either referenced or interpreted by other code modules in either the action layer 705 or process layer 707.

This layered architecture of the presently preferred embodiment of the CPE software application 15 has many advantages. By locating all unique features of a particular application within the application layer 700, the object code in the action layer 705 and process layer 707 may be developed, tested, optimized, and used in all CPE software applications, facilitating new application. Further, by defining the application layer entirely in data, modifications and extensions of a deployed application may be downloaded via the broadband network and applied dynamically, without reinstalling the object code. The process layer 707 defines the only active code; all operations performed by the CPE software application are initiated by the process layer. By clearly defining and limiting the scope of active processes, module interactions are minimized, thereby facilitating the development and testing of robust applications. The action layer 705 defines a library of independent code modules or "actions". Actions are not active processes and can only be invoked by scripts in the application layer 700 or object code in the process layer 707. This modular design facilitates incremental development and clear unit testing of the actions.

Figure 6:
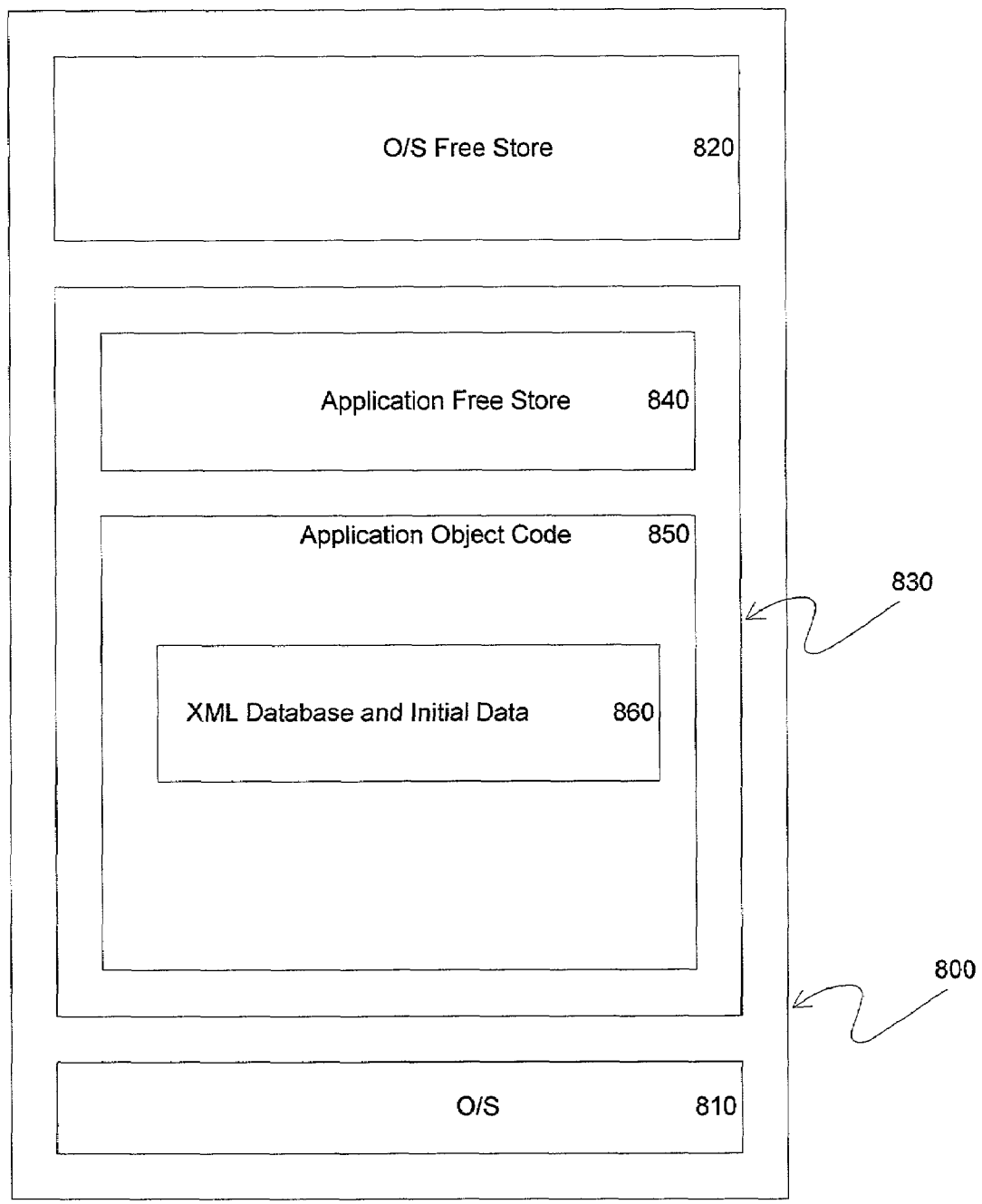
FIG. 6 is a diagram illustrating the presently preferred architecture of a CPE software application according to the present invention.

A logical memory map for the CPE device 10 is depicted in FIG. 6. The operating system object code 810 is typically stored in a contiguous block of memory. Most of the remainder of memory is managed as the O/S free store area 820, from which all subsequent memory is allocated. If the CPE software application 830 is not already available in memory, then, at some point, the operating system object code 800 will allocate a block of memory of sufficient size to store the CPE application object code 850, which is subsequently downloaded via the broadband network 30. Once control is passed to the CPE application object code 850, it must allocate storage for its initial XML database 860, if it has not already done so, from either the operating system free store area 820 or an application specific free store area 840 and then download the initial XML database 860 via the broadband network 30 into the allocated block. Only then will the CPE software application be fully functional.

However, in the preferred embodiment of the subject invention, the initial database and other initial application data 860 are compiled into a contiguous block of the CPE software application object code. Once the application object code 850 is executed and all relative pointer values in this data are translated into absolute pointer values, this initial data may be used immediately without the additional memory allocation and data download. Only storage for new or expanded data must be allocated from the application free store 840. This has several advantages. The time required for the application to become fully functional is significantly shorter than the alternative. Also, because CPE application data, though volatile, seldom expands in size new memory allocation is rare, and memory fragmentation is reduced.

In a system according to the present invention, CPE applications 15 retrieve data from external data sources 55, analyze that data, and process it for possible future display on the CPE display device 30. However, in some embodiments the information that is relevant to the CPE user may not be the retrieved external data itself, but the boolean result of some condition or criteria applied to that data. When data is retrieved that satisfies the condition or criteria the user is alerted to this fact by the presentation of a pre-defined visual or auditory alert signal on the display device.

This generic alert capability allows a great deal of highly relevant information to be presented to the CPE user via a very simple display mechanism. For example, in one preferred embodiment of the subject invention deployed in the digital cable television environment, the CPE application 15 could retrieve recently received e-mail messages from the CPE user's e-mail account server. Display of that e-mail content is neither practical on television displays, nor is it particularly useful, since limitations of the remote control input device make replying to the e-mail messages difficult. Instead, a visual alert in the form of an envelope icon is drawn on the television display on top of the video content whenever an e-mail message is retrieved from a specific sender address, as specified by the CPE user.

The system according to the subject invention employs several mechanisms for presenting information to the CPE user via the CPE display device 130. The visual display mechanisms include, but are not limited to the following: regions of arbitrary shape and color, lines of arbitrary shape and color, static text in a variety of type faces and colors, static graphics, moving text, moving graphics, periodically changing text and graphics, horizontally scrolling text and graphics, vertically scrolling text and graphics, alert messages, alert icon or other graphics, secondary windows, editable text fields, and selectable regions. Additionally, in environments where the broadband network broadcasts video content, that content may be displayed on the display device 130 either occupying the full screen, or resized to be displayed in a smaller region at any location on the display device 130 screen.

Any and all of the display mechanisms may be used in combination simultaneously on the display device 130 screen, and may overlay each other with various levels of transparency. The generation, drawing, and updating of all employed display mechanisms, including animation and movement of horizontal and vertical scrolls and alerts, is coordinated and controlled by object code and scripts executing locally on each individual CPE device.

In one preferred embodiment of the present invention, content is presented to the CPE user via a multi-mode display on the CPE display device 130. FIGS. 7 through 11 depict various display mode formats and demonstrate the use of many of the available display mechanisms. Associated with each display mode are a possible video content region, a graphic background, and one or more display agents. Each display agent draws the formatted content or alerts associated with a particular retrieval agent to a specific region of the display mode format.

Figure 7:
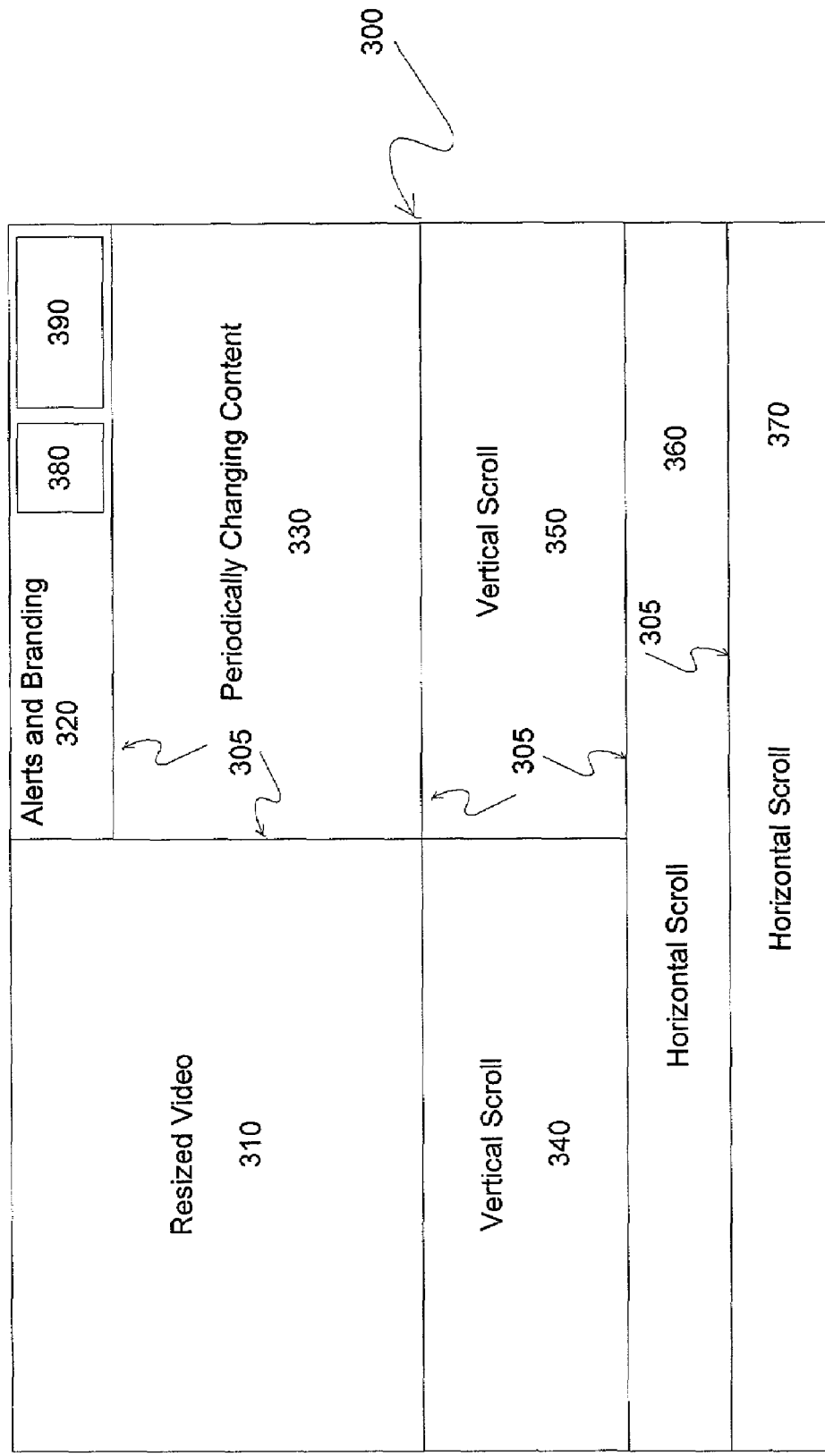
FIG. 7 is a diagram showing the presently preferred display format for combined information, video, and alerts according to the present invention.

FIG. 7 depicts a possible display mode format 300 in which video content and several display agents are combined. A solid color background fills the entire format 300 with lines 305 drawn to delimit various display regions. All other content is displayed on top of this background with no transparency. Video content, if available, is resized and presented in one region 310. Another region 320 is reserved for the display of alert icons 380 and logo graphics 390. Content that will not entirely fit into a single small region is presented in a vertically scrolling regions 340 and 350. Similarly, large amounts of other text and small graphic content is may be presented in horizontally scrolling regions 360 and 370.

In one presently preferred embodiment of the subject invention, deployed in the digital cable television environment, region 330 is reserved for text or graphic information provided by broadband network operators. Local news headlines for several user-customizable regions are displayed in the vertical scroll 340, that can display any number of news headlines by periodically shifting the currently displayed headlines up by one line, erasing the top headline, and displaying a new headline at the bottom. Similarly, customized weather information for several localities is displayed in a weather vertical scroll 350. Customized sports scores and sports news is displayed in the horizontal scroll 360, which displays any sports information, including both text and small graphics, in one long horizontal line that is constantly moving across the screen from right to left, with old characters disappearing off of the left side of the screen as new characters appear on the right. Similarly, customized stock ticker information, including both text and small graphics, is displayed in the horizontal scroll 370. A branding and alert area 320 is provided space for broadband network operators to display a graphic logo 390, and to display an e-mail alert icon 380.

Figure 8:
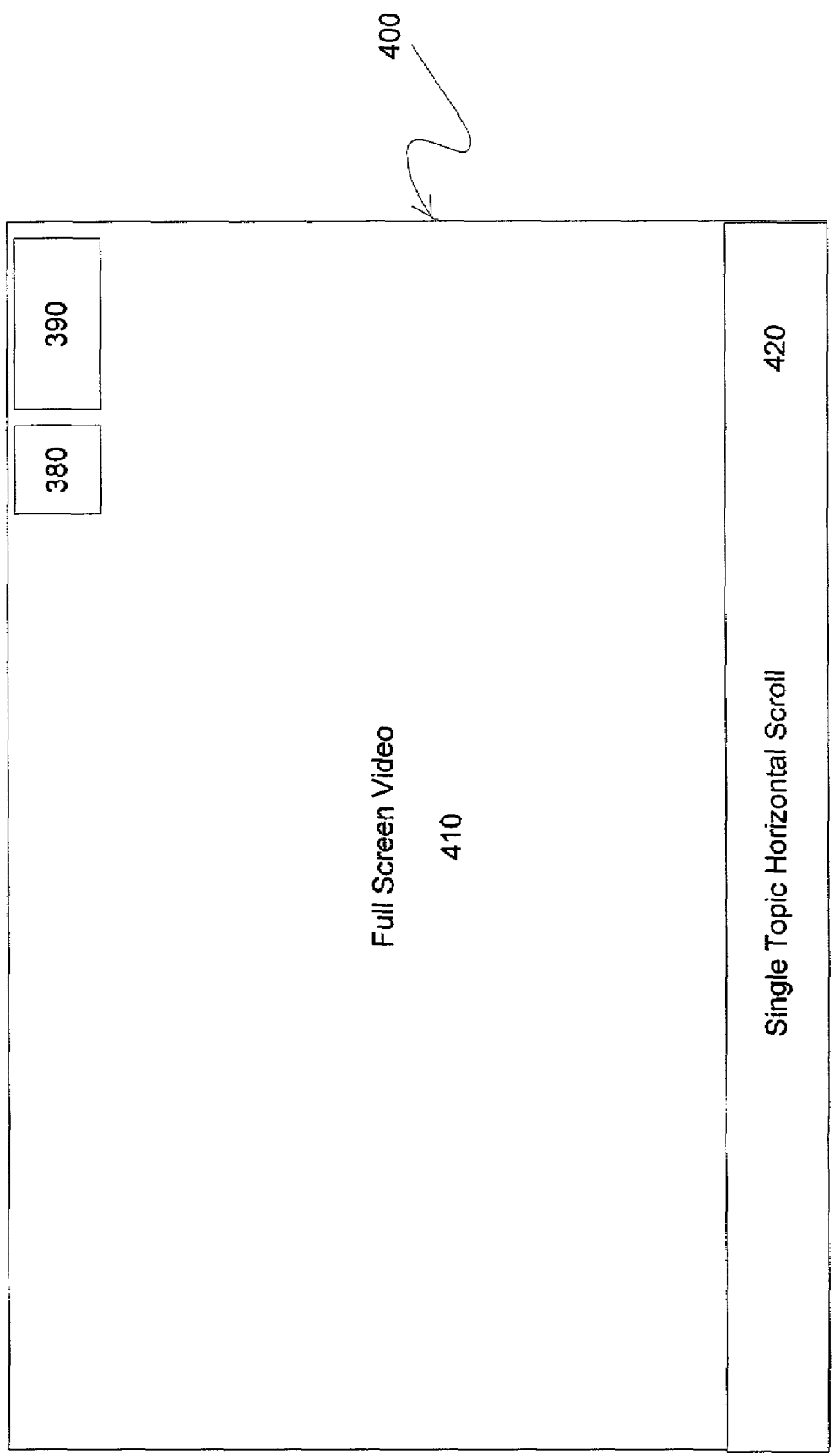
FIG. 8 is a diagram showing the presently preferred display format for single topic information and alerts according to the present invention.

FIG. 8 depicts another possible display mode format 400 in which a single type of information, such as news, weather, sports, or stocks, may be displayed via a horizontal scroll 420 over top of full screen video 410. Alert icons 380 and logo graphics 390 are also included in this display mode. Any of the non-video display items may be drawn with arbitrary levels of transparency to allow the video content beneath them to be partially visible. In one presently preferred embodiment of the subject invention, deployed in the digital cable television environment, several modes use this format, each devoted to one of news and weather content, sports content, or stock content displayed in the horizontal scrolling region 420. In each such mode the alert icon 380 is used to alert the CPE user of recently received e-mail from a specific sender address, as provided by the CPE user.

Figure 9:
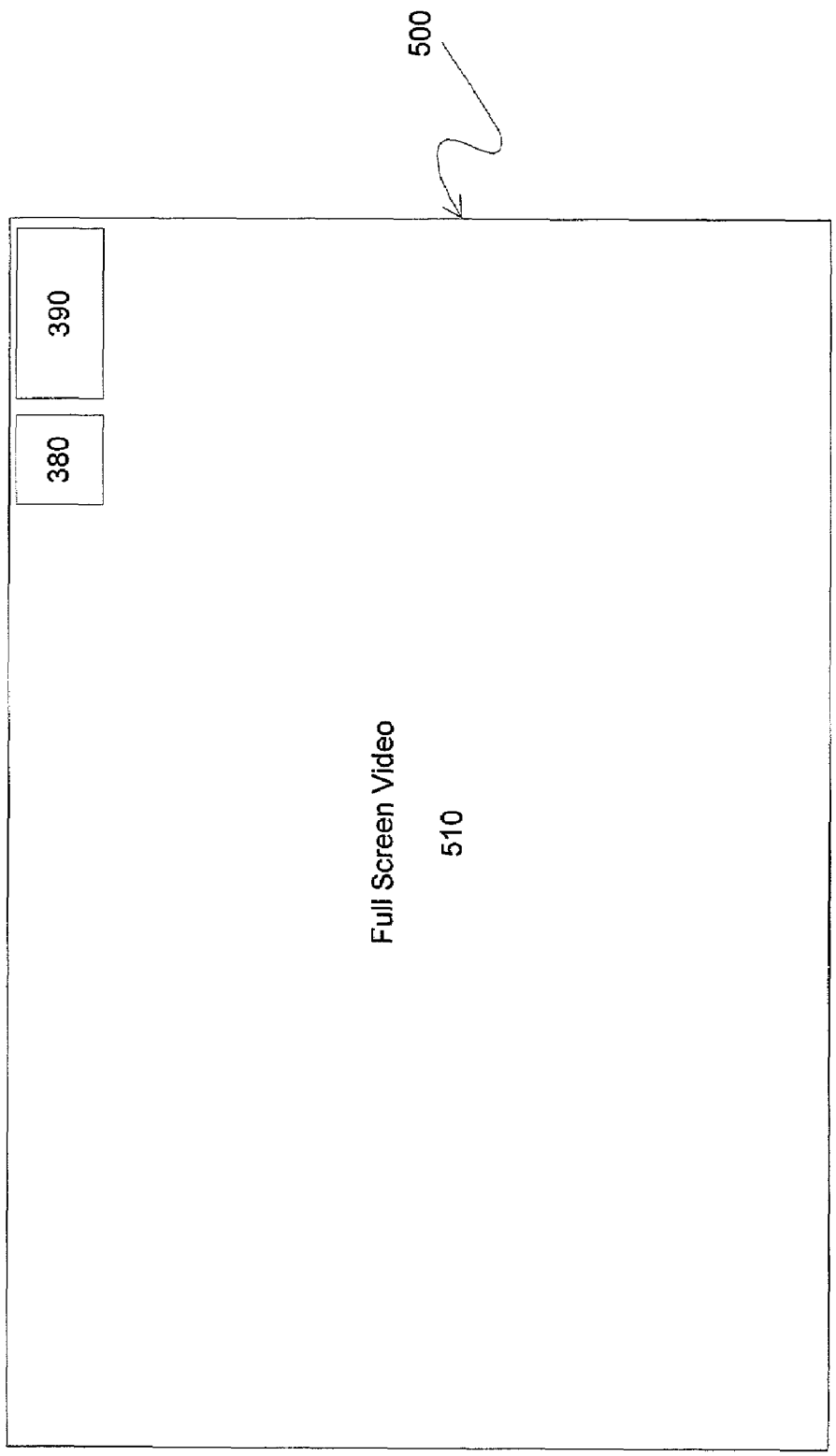
FIG. 9 is a diagram showing the presently preferred display format for alerts and video according to the present invention.

FIG. 9 depicts another possible display mode format 500 in which only an alert graphic 380 and logo graphic 390 overlay full screen video 510, drawn at arbitrary levels of transparency.

Figure 10:
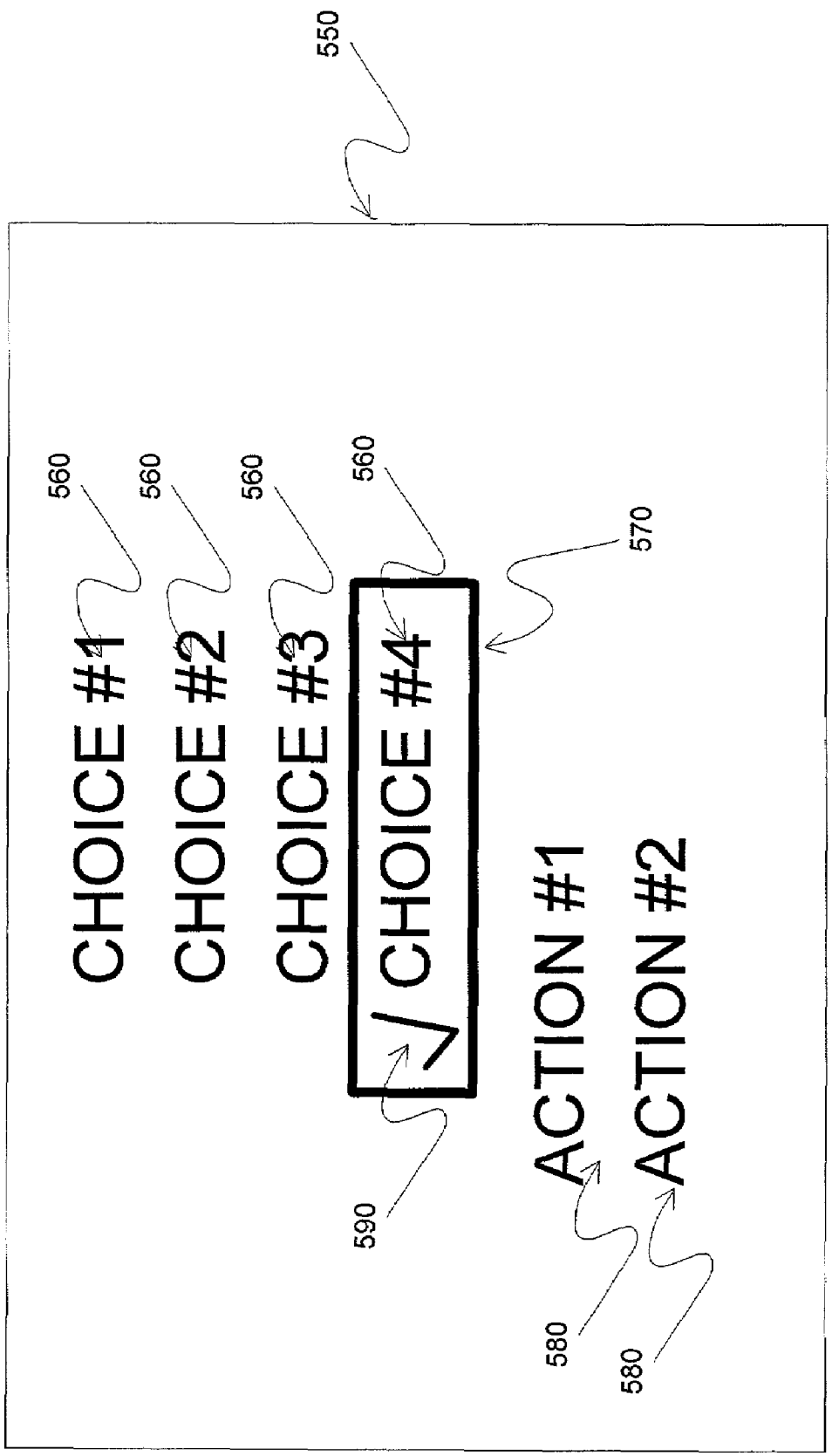
FIG. 10 is a diagram showing the presently preferred display format for a user interface implementing personalization of CPE application settings from a list of choices according to the present invention.

FIG. 10 depicts a possible display mode format 550 that provides a user interface allowing features of the CPE software application to be personalized by the CPE user. An arbitrary number of preference choices 560 are presented to the CPE user as static text combined with selectable regions. Generation of the appropriate input signal via the CPE input device 120 allows the currently highlighted preference choice 560 to be selected. Graphic feedback of selections is provided by an appropriate graphic displayed adjacent to selected choices. Via the navigation keys of a CPE input device 120 different choices can be selected and subsequently stored in the preference data. An arbitrary number of action choices 580 are also presented as static text combined with selectable regions. Selection of such an action permits navigation through various display modes and also performs one or more side-effect operations, such as recording all selected choices to persistent data storage. In one presently preferred embodiment of the subject invention, deployed in the digital cable television environment, many of the display modes use formats similar to this one to allow a CPE user to personalize CPE application 15 preference settings.

Figure 11:
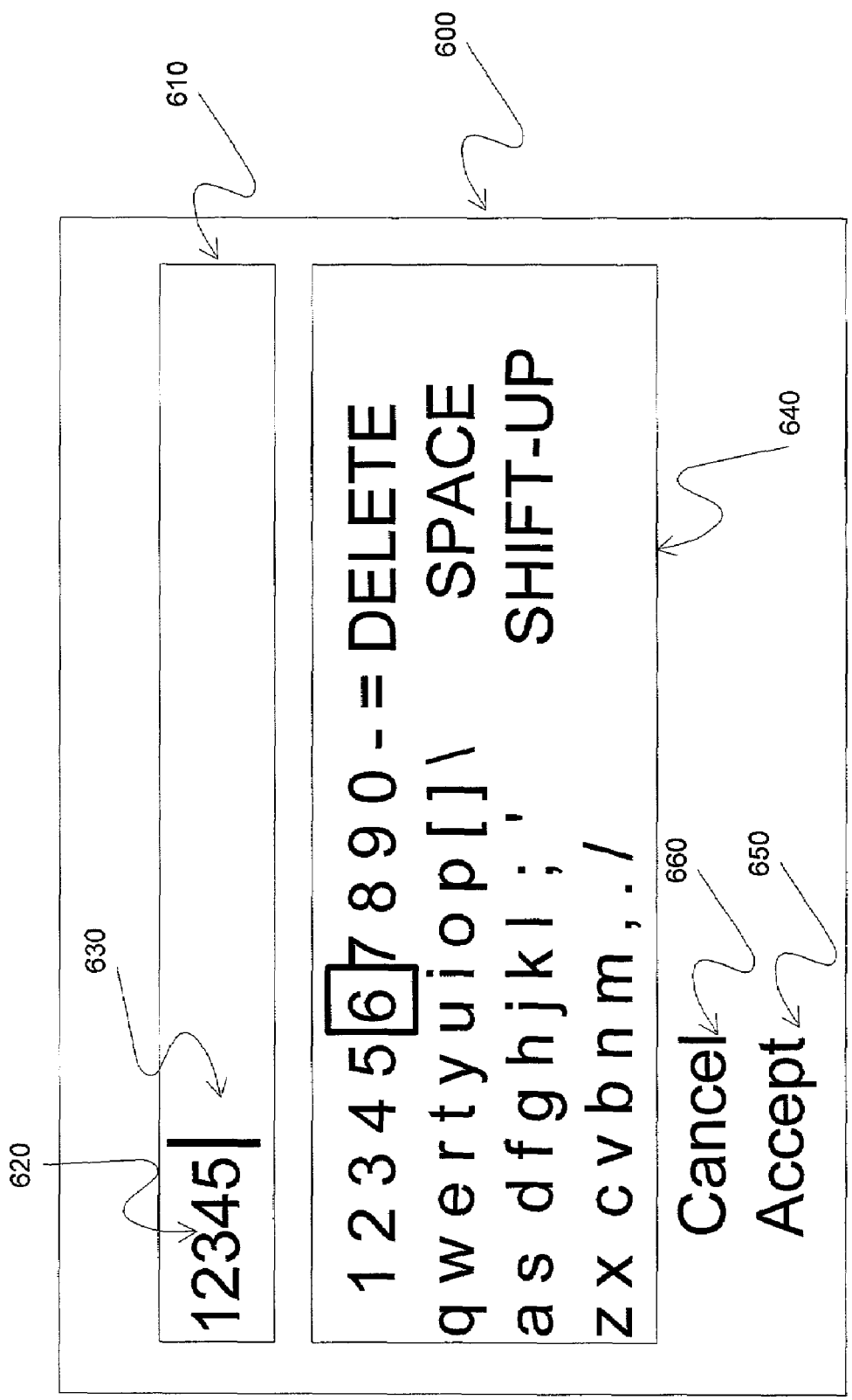
FIG. 11 is a diagram showing the presently preferred display format for a virtual keyboard according to the present invention.

FIG. 11 depicts a possible display mode format 600 that provides a virtual keyboard. Users of CPE devices that have limited input devices 120, such as a digital cable television remote control, can select the various selectable regions on this format to enter custom preferences where the list of possible choices is so large as to make the display mode 550 impractical. In one presently preferred embodiment of the subject invention, deployed in the digital cable television environment, several personal settings modes use this display format to gather settings information, such as zip codes and stock symbols.

The diagrams in FIGS. 12 through 18 describe some processes preferably embodied in a preferred implementation of the subject invention.

Figure 12:
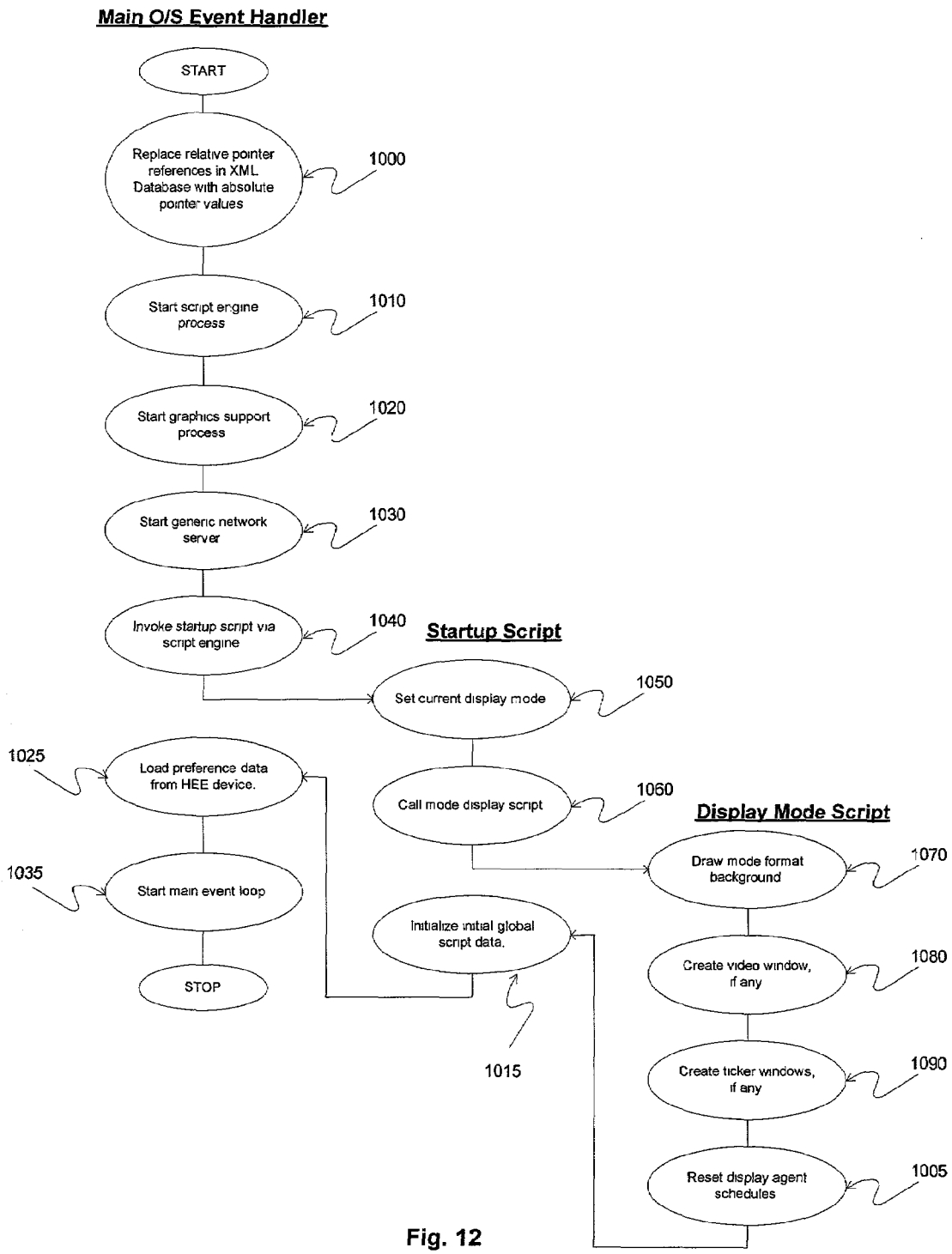
FIG. 12 is a flow chart showing aspects of operation of a system according to a presently preferred embodiment of the invention.

The startup process of the CPE application 15 is diagramed in FIG. 12. Once the CPE application 15 begins execution it must immediately replace all relative pointer references in its internal XML database with the corresponding absolute pointers 1000. This process is almost instantaneous. The new processes or thread of execution are spawned for the script engine process 1010, the graphics support process 1020, and the generic network server 1030. Descriptions of those additional processes is provided below. After spawning off the other active processes the main application process locates the startup script in the application scripts 710 and calls it 1040. The startup script sets the current mode global variable to the initial mode 1050 and calls the display script corresponding to that mode 1060. The display mode script draws the format background 1070 on the CPE display device 130, creates a video window if appropriate for the current mode 1080, creates special "ticker" windows 1090 for any horizontally scrolling regions in the current mode format, and resets the schedules for all display agents that apply to the current mode 1090 so that they expire immediately. The mode display script then returns control to the startup script, which initializes all other global script data 1015. The startup script then returns control to the main application thread, which loads the preferences 1025 for the particular CPE device 10 via an HTTP request to the preference storage server 190. At this point the special startup activities are complete, and the main application process begins execution of the main event loop.

Figure 13:
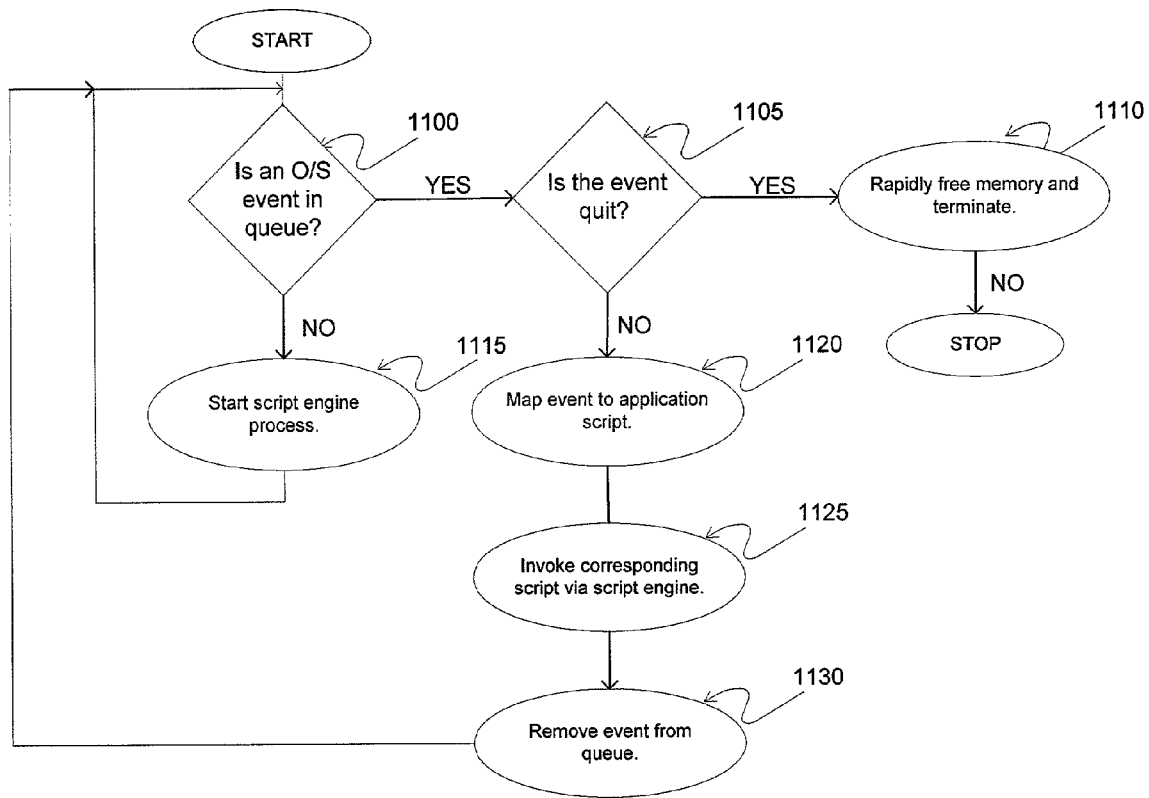
FIG. 13 is a flow chart showing additional aspects of operation of a system according to a presently preferred embodiment of the invention.

The main event loop of the CPE application, executed by the main O/S event handler process 717, is diagrammed in FIG. 13. At the top of the loop the O/S event queue is examined to determine whether or not an O/S event is available 1100. If not, some small fraction of a second is yielded to other processes 1115, and the queue is examined again 1100. If an O/S event is found in the queue, it is first examined to determine whether or not it is a QUIT event 1105; and if so the CPE application must rapidly stop all processes, free all memory and terminate 1110. All other types of events are then mapped to a script 1120, which may be empty, located in the application scripts 710. The corresponding script is invoked 1125 via the script engine 757 to handle the event. The event is then removed from the O/S event queue 1130 and control returns to the top of the main event loop 1100.

Figure 14:
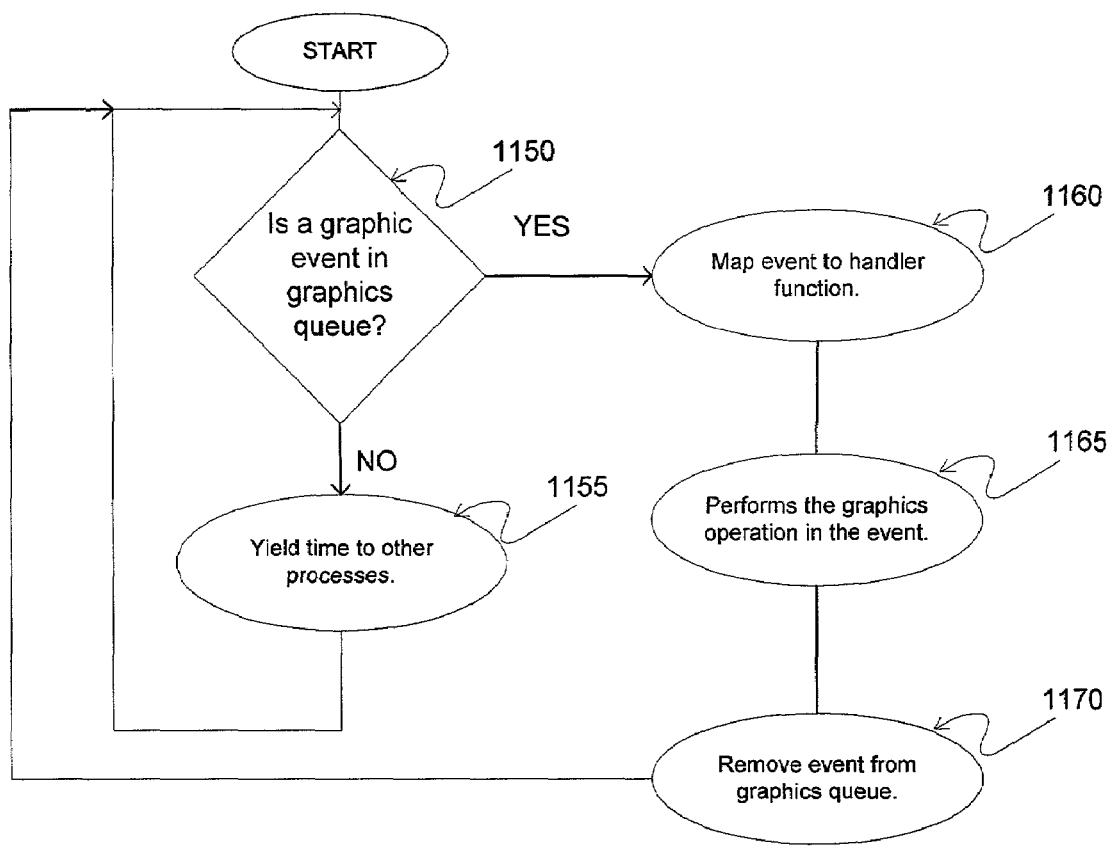
FIG. 14 is a flow chart showing additional aspects of operation of a system according to a presently preferred embodiment of the invention.

The graphic support process 747 is diagrammed in FIG. 14. At the top of the graphics process event loop, the graphics queue is examined to determine whether or not a graphics event is available 1150. If not, some small fraction of a second is yielded to other processes 1115, and the queue is examined again 1150. If a graphics event is found in the queue, its event type is mapped 1160 to a one of the many graphics actions 725, and the corresponding action is invoked to handle the event 1170. Control then returns to the top of the loop 1150.

Figure 15:
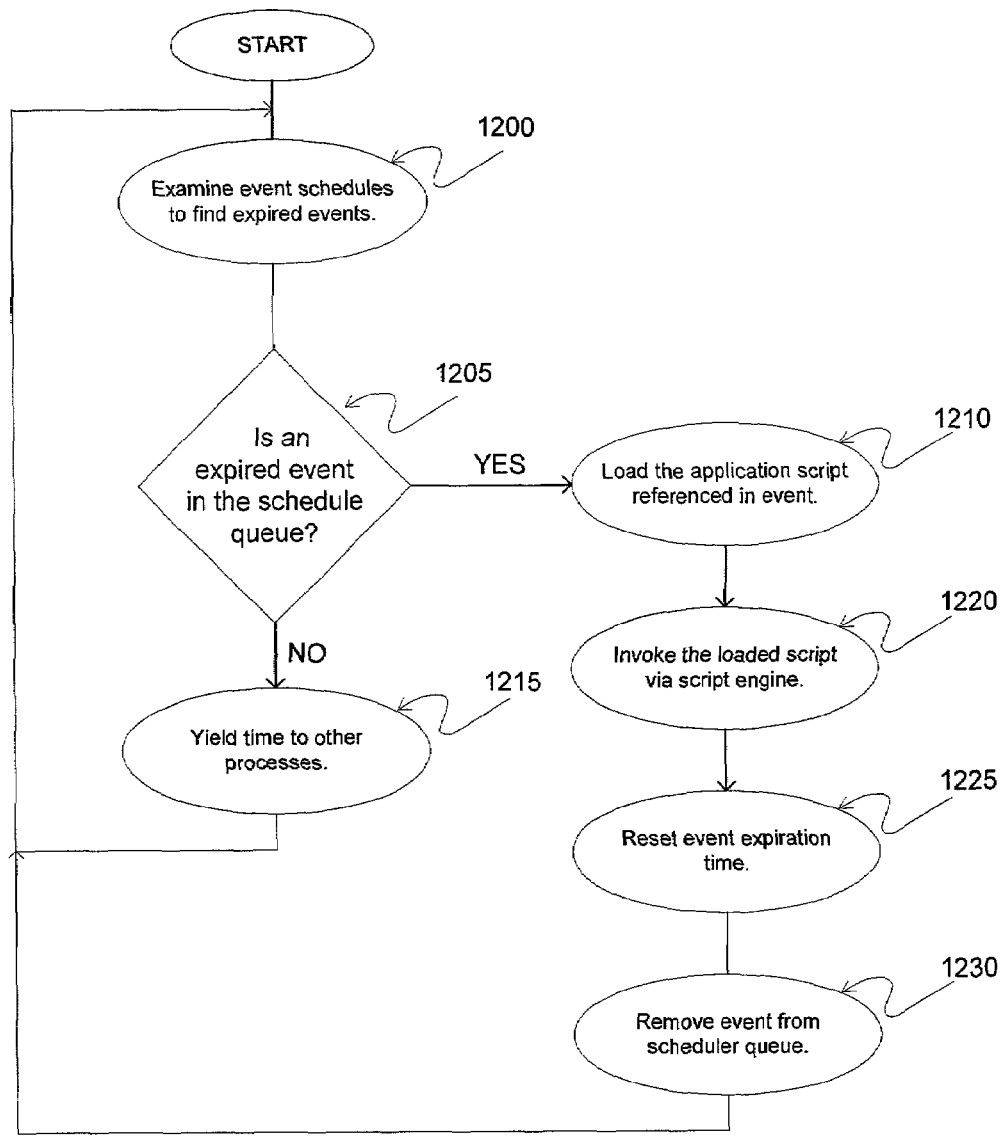
FIG. 15 is a flow chart showing additional aspects of operation of a system according to a presently preferred embodiment of the invention.

The scheduler process 727 is diagrammed in FIG. 15. At the top of the loop 1200 the event schedules 740 are examined to find any scheduled events with expired timers and place them on the scheduler queue. If the scheduler queue is found to be empty 1205, several seconds of processing time are yielded to other processes 1215, and then control returns to the top of the loop 1200. However, if a scheduled event is in the scheduler queue 1205, the corresponding event script is located 1210 in the application scripts 710 and invoked 1220 via the script engine 757. Upon completion of the event script the expiration timer associated with the event, and located in the event schedules 740, is incremented by the appropriate interval 1225, and the event is removed from the scheduler queue. Control then returns to the top of the loop 1200.

Figure 16:
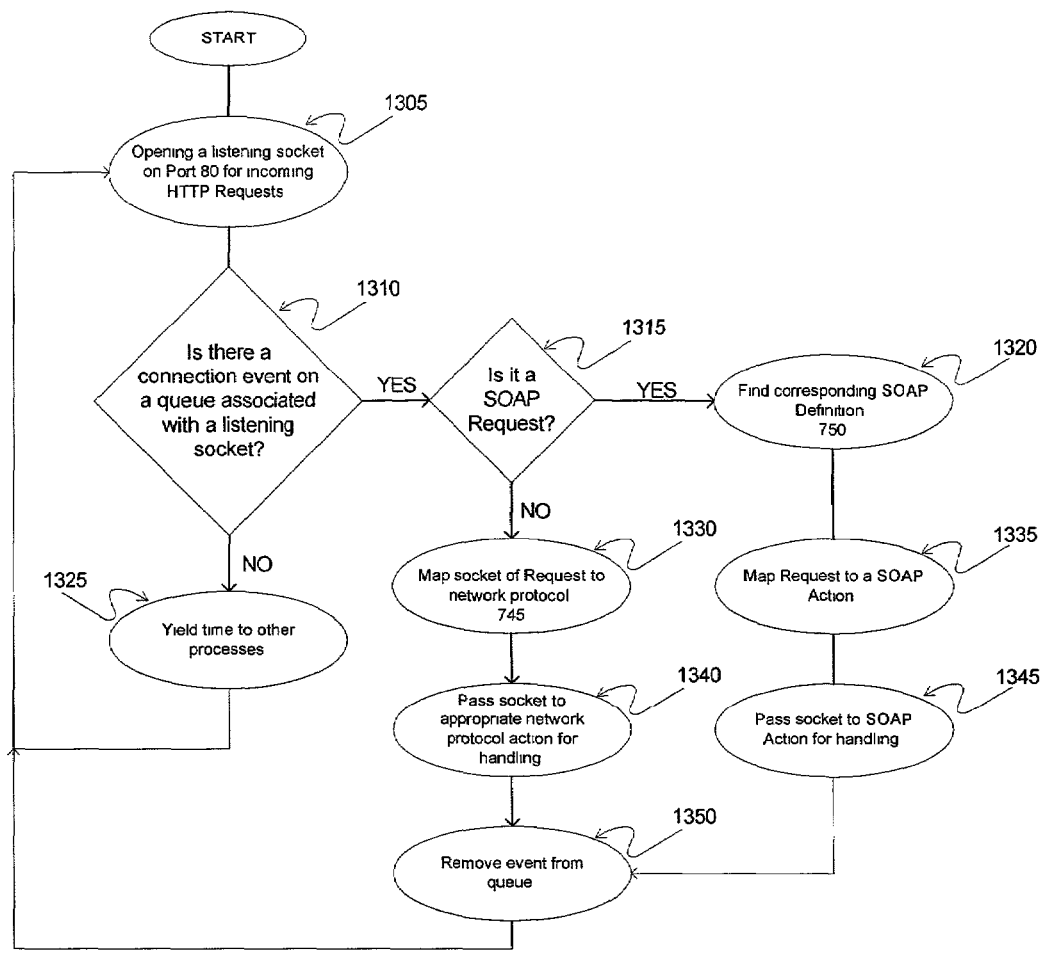
FIG. 16 is a flow chart showing additional aspects of operation of a system according to a presently preferred embodiment of the invention.

The generic network server process 737 is diagrammed in FIG. 16. The generic network server is designed to handle all initial socket listens required to implement TCP/IP-based protocol servers. Once an incoming socket connection is established, a network protocol action 745 associated with the listening socket and port is invoked to actually handle the server side of the protocol transaction. Initially, the generic network server event loop 1305 opens a listening socket, on the appropriate ports, to support any required servers. The top of the process loop then looks for a connection event in one of the queues associated with a listening socket 1310. If none are found, a small fraction of a second of processing time is yielded to other processes 1325, and control returns to the top of the loop 1310. If a socket connection event is found in one of the server queues it is first examined to determine whether or not it represents a SOAP protocol request 1315. If so, a corresponding SOAP service definition, which may be empty, is located 1320 in the SOAP service definitions 750. The SOAP service definition and the actual socket connection are then passed to the appropriate SOAP action 735 for handling of the SOAP request 1345. The handled connection event is then removed from the server queue 1350, and control returns to the top of the loop 1310.

If a connection event is found on a queue 1310, but it is not a SOAP protocol request 1315, the queue is mapped 1330 to an appropriate network protocol action 745, and the connection is passed to that action for further handling 1340. The event is then removed from the event queue 1350, and control returns to the top of the loop 1310.

Figure 17:
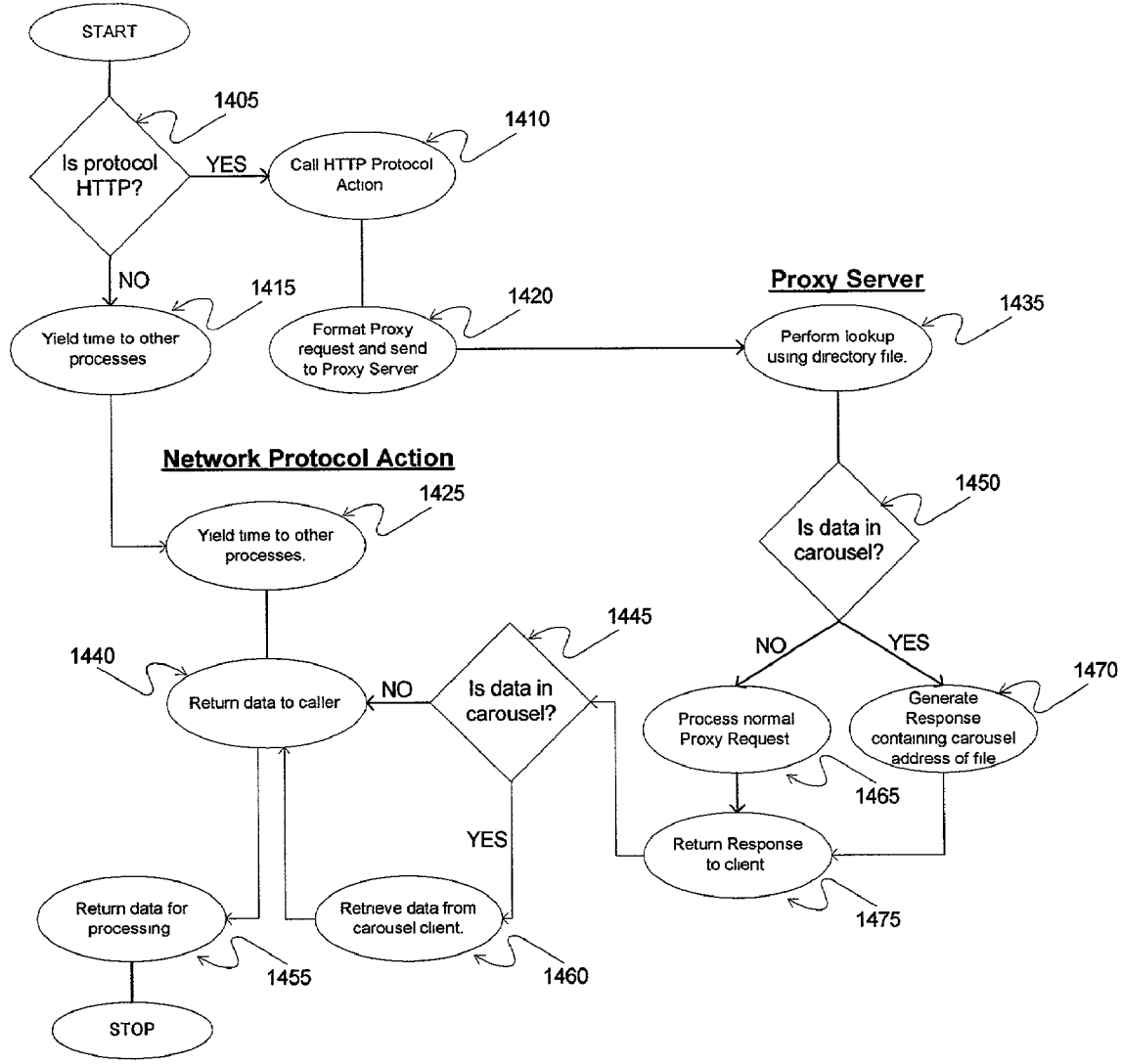
FIG. 17 is a flow chart showing additional aspects of operation of a system according to a presently preferred embodiment of the invention.

FIG. 17 diagrams the process by which a retrieval agent action 755 processes requests for content from external sources 55 via the proxy server 180 and data carousel server 200. Initially, the requested URL is examined to determine if the request protocol is http 1405. If not, the network protocol action 745 corresponding to the request protocol is invoked 1415; it retrieves the requested data from the external source 55 directly 1425 and returns that data 1440 to the retrieval agent action 755; and the data is then returned to the original caller 1455 for processing. If, however, the request protocol is http 1405, the HTTP protocol action 745 is invoked 1410 to format and send a proxy request 1420 to the proxy server 180 on the HEE device 45. The proxy server 180 examines the request and searches for a matching file in the carousel data directory file 215 constructed by the carousel manager 210. If found 1450, the corresponding carousel address found in the directory file 215 is embedded in an HTTP response 1470, and that response is returned 1475 to the proxy server 180. Otherwise the proxy server treats the request as normal and retrieves the file 1465. Either way, the resulting response is returned to the HTTP client 1475. The HTTP client protocol action 745 examines the response 1445 to determine if it contains the actual data from the proxy server, or a carousel address. If the latter is true, the data carousel client 767 is invoked 1460 to retrieve the data. Either way, the data is returned 1440 to the retrieval agent action 755, and then to the original caller 1455.

Figure 18:
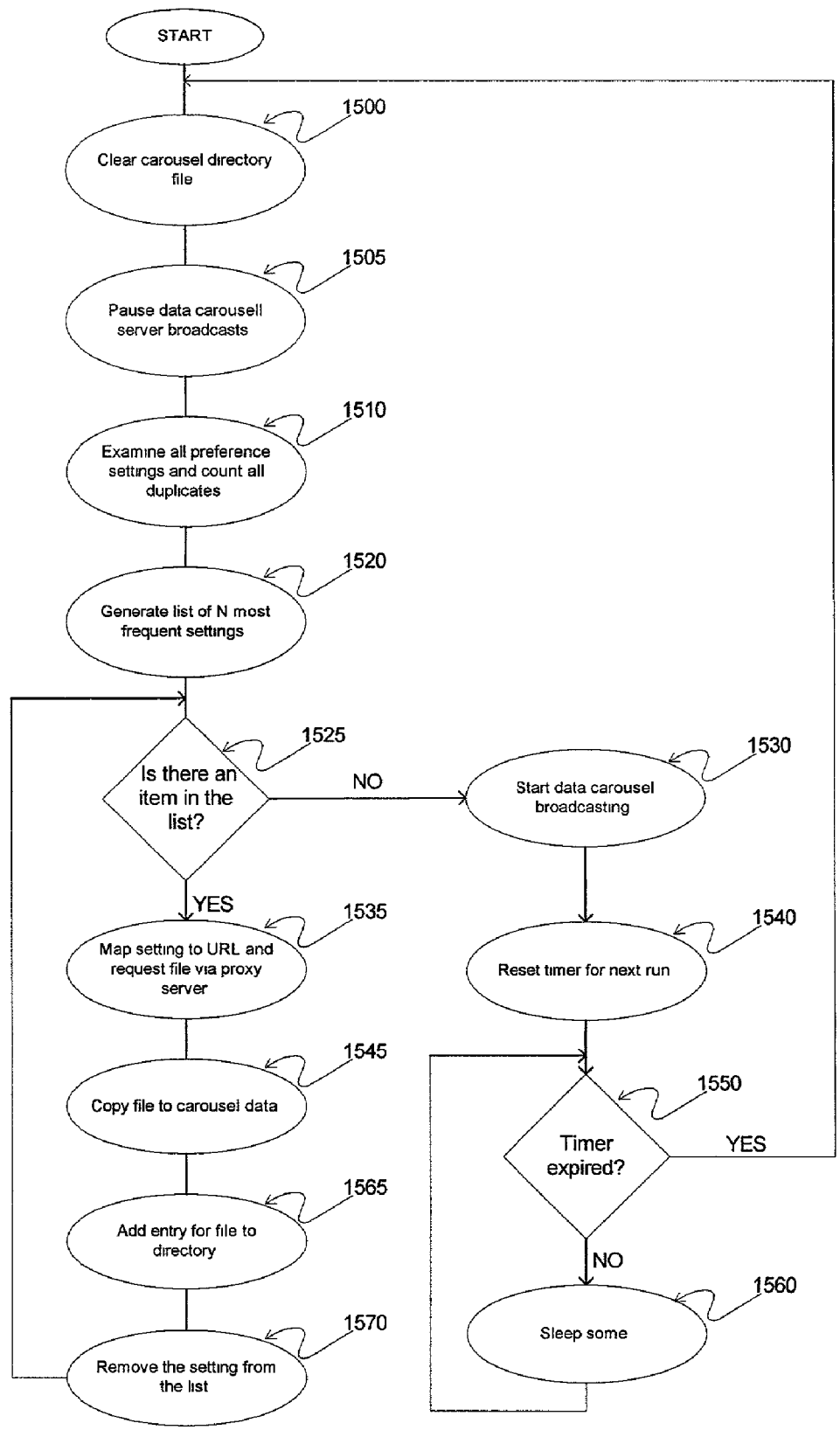
FIG. 18 is a flow chart showing additional aspects of operation of a system according to a presently preferred embodiment of the invention.

The process by which the data carousel manager software application 210 periodically loads the carousel with data is diagrammed in FIG. 18. Initially, the carousel directory file 215 is erased 1500 to temporarily prevent proxy server 180 responses that send the HTTP client action 745 to the carousel for the data. The carousel server software application 210 is then instructed to stop broadcasting 1505. The data carousel manager 210 the examines all preference settings found in the preferences data 230 and counts all duplicate settings entries 1510. A list of the N settings with the highest counts is then constructed, where N is some number determined by bandwidth analysis. In one preferred embodiment of the subject invention, the value of 50 is used for N. The list of frequently referenced settings is then examined 1525. If there are no items in the list, the data carousel server application 210 is instructed to begin broadcasting again 1530, and a timer is set to expire when the process should repeat, usually many hours later 1540. If the timer has expired then control returns to the top of the loop 1500. Otherwise, processing time is yielded to other processes for several minutes or seconds, then control returns to the timer expiration test 1550.

If, however, there are items in the list of commonly referenced settings then the first item in the list is selected 1525 and mapped to a URL and passed to the proxy server 180 for retrieval 1545. The resulting data file is stored in the carousel data 1545 and a corresponding entry for the file, along with the necessary carousel address information, is written 1565 to the carousel data directory file 215. The current setting is then removed from the list 1570, and control returns to processing the next item in the list 1525.

While specific embodiments of the invention have been shown and described in detail to illustrate the application of the principles of the invention, it will be understood that the invention may be embodied otherwise without departing from such principles.

What is claimed is

1. A system for providing customizable interactive television service using a broadband network, said system comprising:

a plurality of CPE devices, said plurality of CPE devices being configured to implement at least one customizable interactive computer service, to bi-directionally communicate using an IP protocol over a broadband network to request, based on user supplied criteria, information from data sources connected to external computer networks, said information supplied in response to the request, to process the retrieved information, and to internally generate, format and display graphical elements representing at least a portion of the processed retrieved information locally on a television display device, wherein each of the plurality of CPE devices comprises a software application, wherein the software application performs substantially all computational tasks required to implement said at least one customizable interactive computer service, wherein performing substantially all computational tasks comprises: retrieving data indicative of the customizable interactive computer service from at least one external data source communicatively coupled to said broadband network, analyzing the retrieved data, and integrating the retrieved data in the customizable interactive computer service, and wherein said software application is adapted to be personalized by a user; and a remote server computer configured to provide persistent storage services to each of said plurality of CPE devices; and a remote server computer to optimize network bandwidth utilization, said remote server computer is configured to store customized application preferences for the plurality of CPE devices, wherein said customized application preferences are used to provide statistical data that is used to configure a bandwidth optimization service.

2. A system as claimed in claim 1 wherein said broadband network environment is a digital cable television environment.

3. A system as claimed in claim 1 wherein said broadband network environment is a digital satellite television environment.

4. A system as claimed in claim 1 wherein said CPE has no persistent storage.

5. A system as claimed in claim 1 wherein said broadband network environment is a game console network environment.

6. A system as claimed in claim 1 wherein said broadband network environment is a home gateway environment.

7. The system of claim 1, wherein the graphical elements are animated.

8. A system for interactive television content distribution using customer premises equipment having a capability to internally generate, format and display graphics, the system comprising:

a server connected to a broadband network;

a plurality of local user devices for customizable two-way interaction with said server over said broadband network, each of said plurality of local user devices being connectable to a television display respectively and being adapted to cause said television display to show content broadcast over said broadband network to each of said plurality of local user devices respectively, each of said plurality of local user devices including a data structure representing a software application which, when executed, enables each of said plurality of local user devices to interface with said broadband network to provide, respectively, at least one customizable interactive computer service in response to a user request, each of the plurality of local user devices configured to be able to internally generate, format and display graphics elements reflecting said at least one customizable interactive computer service respectively, wherein internally formatting graphics elements comprises: managing the graphical elements to provide one or more levels of transparency, user-customizable regions and scrolling functionality, and wherein said plurality of local user devices are capable of performing substantially all computational tasks required to implement said at least one customizable interactive computer service, and wherein the software application of each said plurality of local user devices is adapted to be personalized by a user respectively; and a remote support server connected to the broadband network, wherein the remote support server is configured to provide support services to augment capabilities of said plurality of local user devices, to provide remote persistent storage services for said plurality of local user devices, and to store preference data for respective users of said plurality of local user devices.

9. The system as claimed in claim 8, wherein said at least one customizable interactive computer service comprises customizable retrieval of data from internet, wherein the customization is performed locally in the plurality of local user devices.

10. The system as claimed in claim 8, wherein the support server is configured to optimize bandwidth utilization of the broadband network.

11. The system as claimed in claim 8, wherein said support server is further configured for storing customized application preferences.

12. The system as claimed in claim 8, wherein said support server is further configured to provide data carousel services to repeatedly broadcast out carousel data to said plurality of devices simultaneously.

13. The system as claimed in claim 12, wherein said carousel data is selected based at least in part on said preference data.

14. The system as claimed in claim 8, wherein each of said plurality of devices is a CPE device.

15. The system as claimed in claim 14, wherein said CPE device is configured to use an IP protocol to upload customized preferences data to said support server after a user makes changes to said customized preferences data, and to download said customized preferences data from said support server.

16. The system as claimed in claim 14, wherein said CPE device is additionally connected to an external IP-based network through said broadband network.

17. The system as claimed in claim 16, wherein said external IP-based network is additionally connected to a plurality of network data sources.

18. The system as claimed in claim 8, wherein said broadband network is a wired network.

19. The system as claimed in claim 8, wherein said broadband network is a wireless network.

20. The system as claimed in claim 8, wherein said broadband network comprises a cable television network.

21. The system as claimed in claim 8, wherein said broadband network comprises a satellite television network.

22. The system as claimed in claim 8, wherein said broadband network comprises a local area network (LAN).

23. The system as claimed in claim 8, wherein said broadband network comprises a wide area network (WAN).

24. The system as claimed in claim 8, wherein said broadband network comprises an analog telephone network.

25. The system as claimed in claim 8, wherein said broadband network comprises a digital telephone network.

26. The system as claimed in claim 8, wherein said broadband network comprises the Internet.

27. The system as claimed in claim 8, wherein said broadband network is capable of carrying TCP/IP network traffic.

* * * * *

UNITED STATES PATENT AND TRADEMARK OFFICE
CERTIFICATE OF CORRECTION

PATENT NO. : 7,613,790 B2  Page 1 of 1
APPLICATION NO. : 10/173565
DATED : November 3, 2009
INVENTOR(S) : Slothouber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Nineteenth Day of October, 2010

David J. Kappos
*Director of the United States Patent and Trademark Office*